(12) United States Patent
Liu

(10) Patent No.: US 11,314,230 B2
(45) Date of Patent: Apr. 26, 2022

(54) MACHINING PROGRAM GENERATION SUPPORT DEVICE

(71) Applicant: FANUC CORPORATION, Yamanashi (JP)

(72) Inventor: Zhaojia Liu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/986,504

(22) Filed: Aug. 6, 2020

(65) Prior Publication Data

US 2021/0063998 A1 Mar. 4, 2021

(30) Foreign Application Priority Data

Aug. 27, 2019 (JP) .............................. JP2019-154765

(51) Int. Cl.
*G05B 19/4097* (2006.01)
*G06F 30/10* (2020.01)

(52) U.S. Cl.
CPC .................. *G05B 19/4097* (2013.01); *G05B 2219/35189* (2013.01); *G06F 30/10* (2020.01)

(58) Field of Classification Search
CPC ...... G05B 19/4097; G05B 2219/35189; G06F 30/10
See application file for complete search history.

(56) References Cited

U.S. PATENT DOCUMENTS

| 10,810,699 B2* | 10/2020 | Komeichi | G06T 7/33 |
| 2014/0172151 A1* | 6/2014 | Niwa | G05B 19/4068 |
| | | | 700/186 |
| 2015/0100269 A1* | 4/2015 | Ashjaee | G01S 19/42 |
| | | | 702/150 |
| 2015/0362310 A1* | 12/2015 | Taniguchi | G01B 21/047 |
| | | | 356/4.01 |
| 2016/0011583 A1* | 1/2016 | Matsubara | G05B 19/40937 |
| | | | 700/181 |
| 2017/0115109 A1* | 4/2017 | Noda | G01B 21/04 |
| 2019/0384252 A1* | 12/2019 | Wang | G05B 19/4069 |
| 2021/0109502 A1* | 4/2021 | Yasukochi | B23Q 15/00 |

FOREIGN PATENT DOCUMENTS

JP H11-066112 A 3/1999

* cited by examiner

*Primary Examiner* — Thomas C Lee
*Assistant Examiner* — Ameir Myers
(74) *Attorney, Agent, or Firm* — Studebaker & Brackett PC

(57) ABSTRACT

A machining program generation support device includes: a CAD data analysis unit which analyzes the CAD data of a workpiece so as to obtain CAD shape information; a machining program analysis unit which analyzes a machining program that is in the middle of being produced by an operator so as to obtain machining shape information; a relative position matching unit which performs relative position matching of shapes of the CAD shape information and the machining shape information so as to obtain relative position matching shape information and to determine, based on the relative position matching shape information, whether or not an input error of a position is made by the operator in the machining shape information; and a display unit which displays the machining shape information and which displays a part of the input error of the position and made by the operator in the machining shape information.

4 Claims, 24 Drawing Sheets

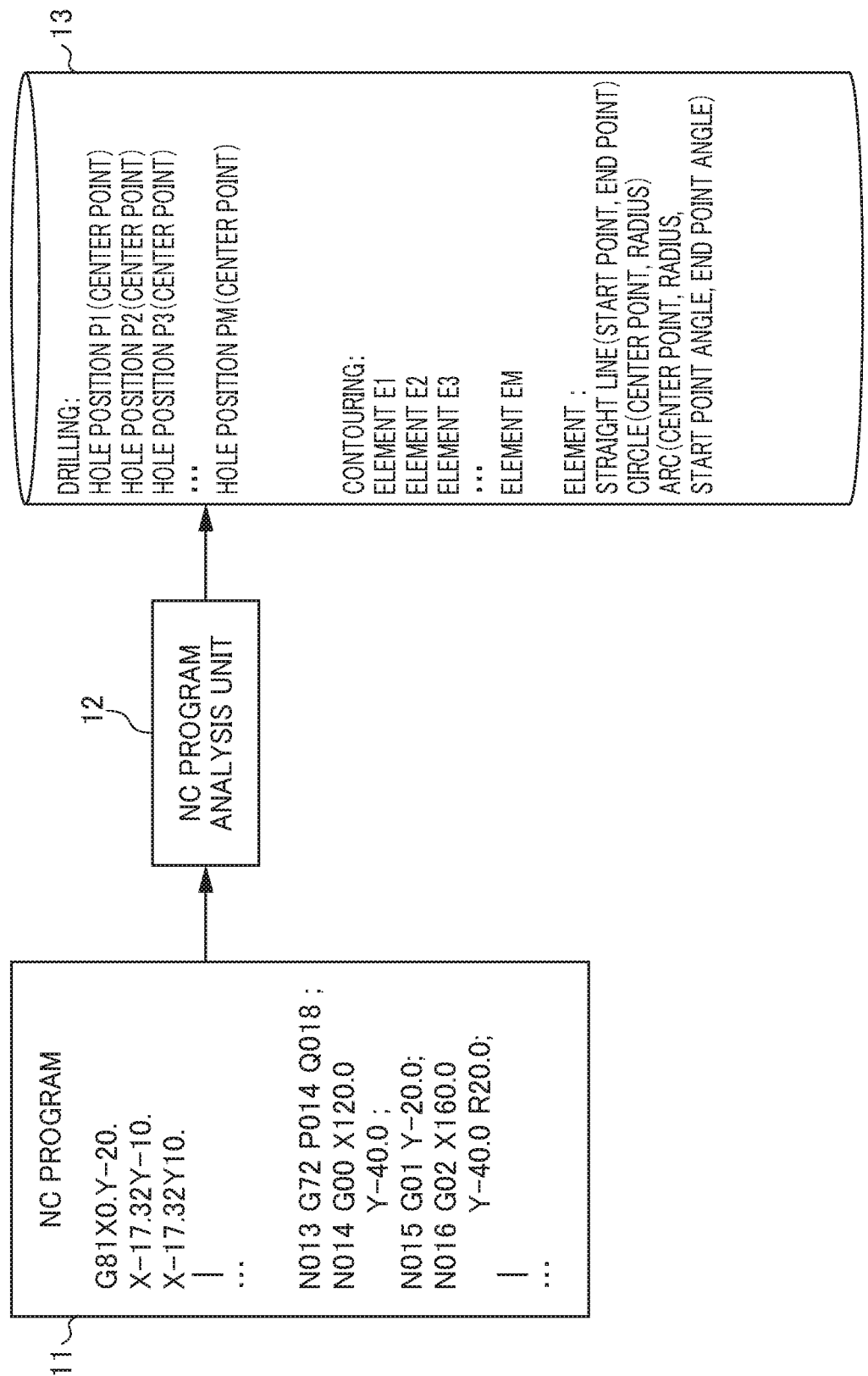

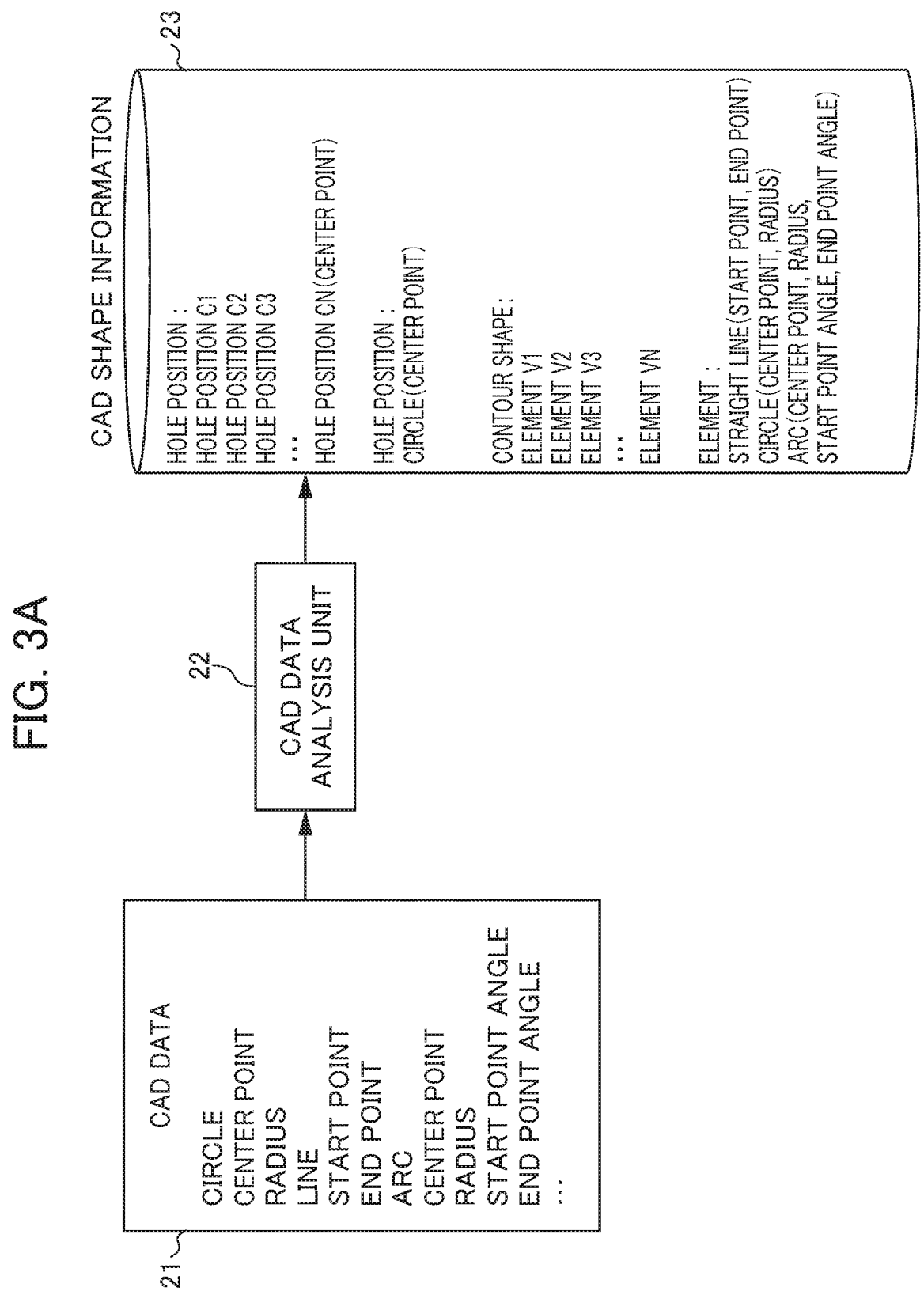

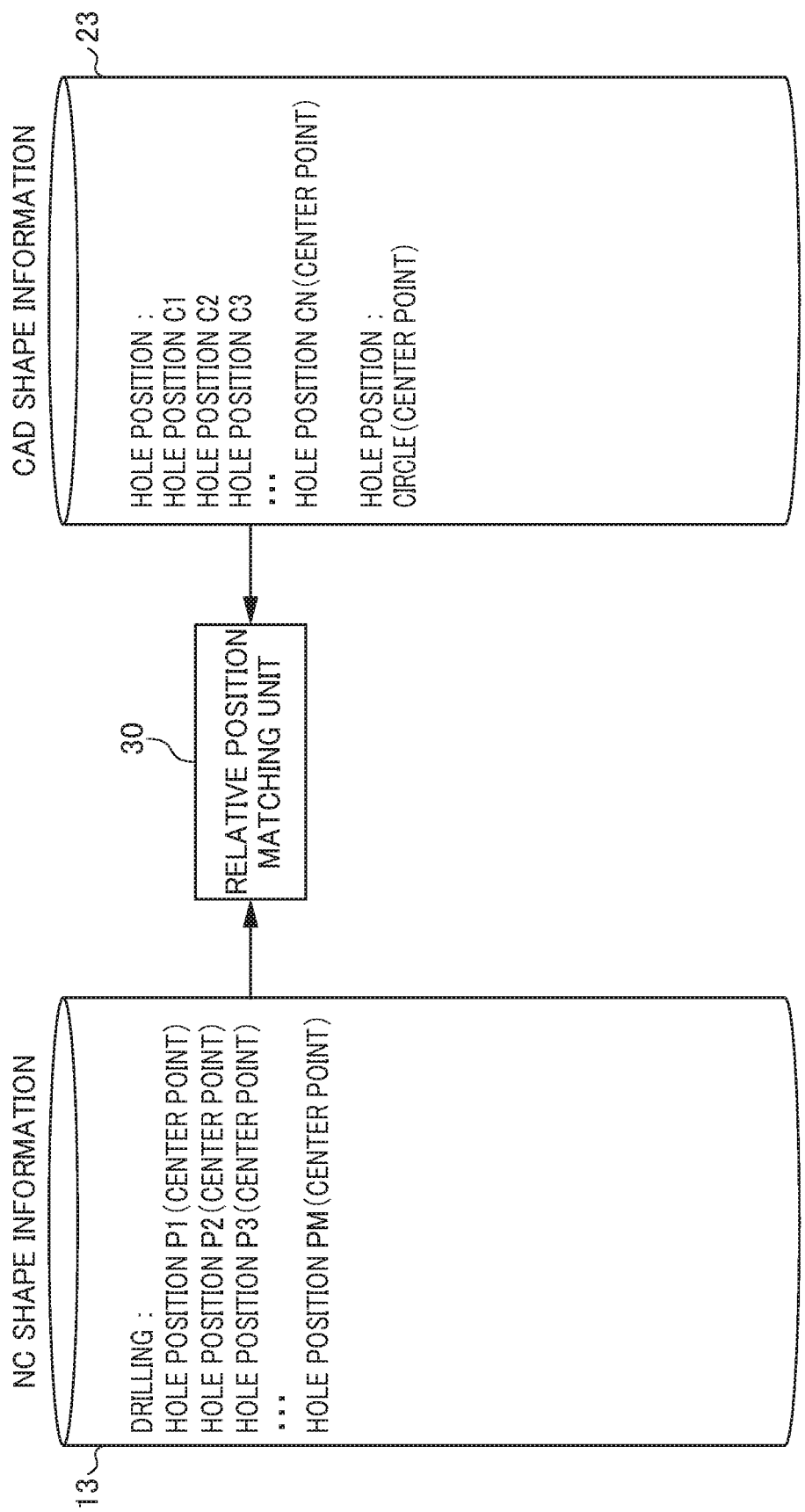

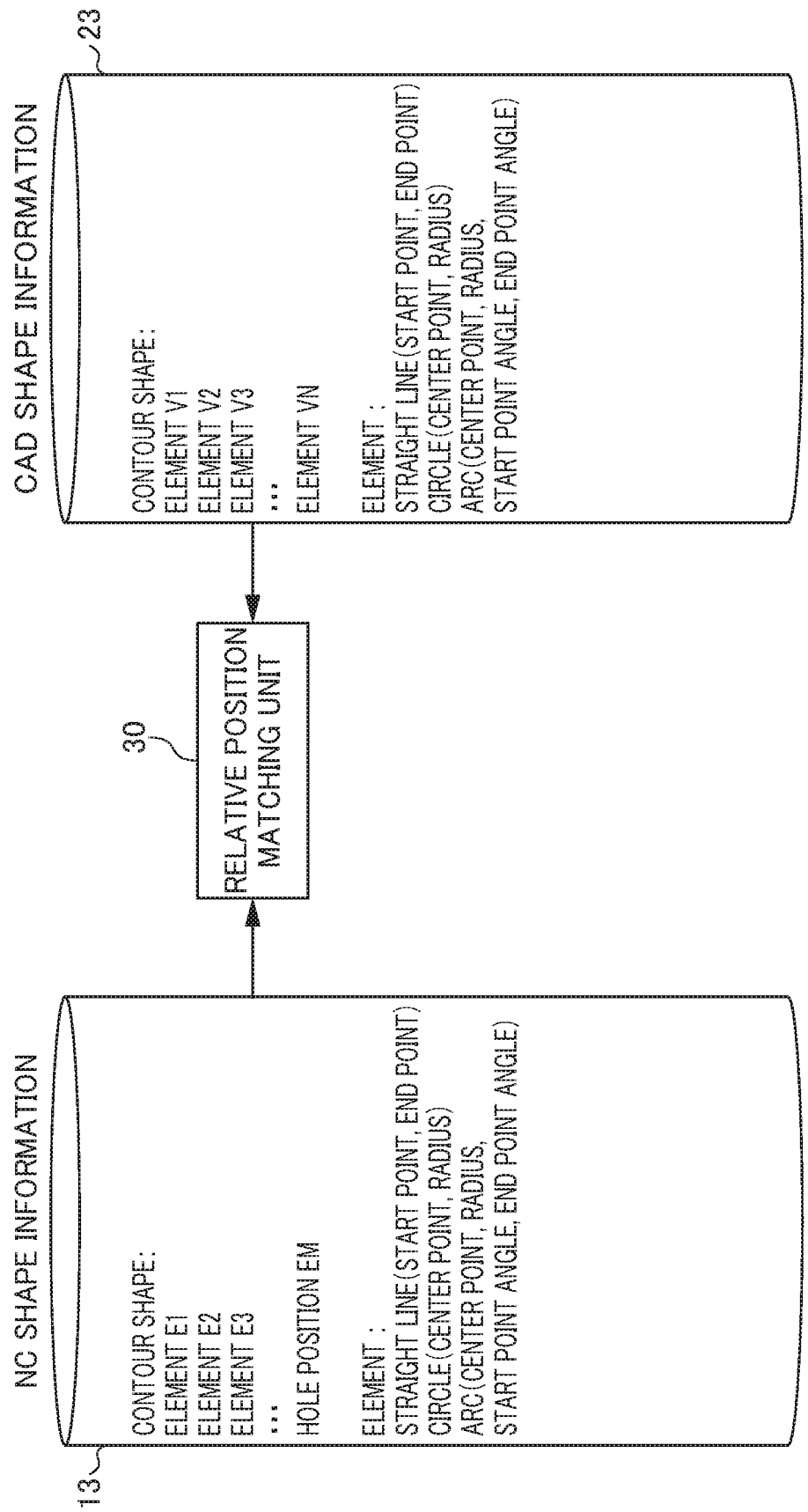

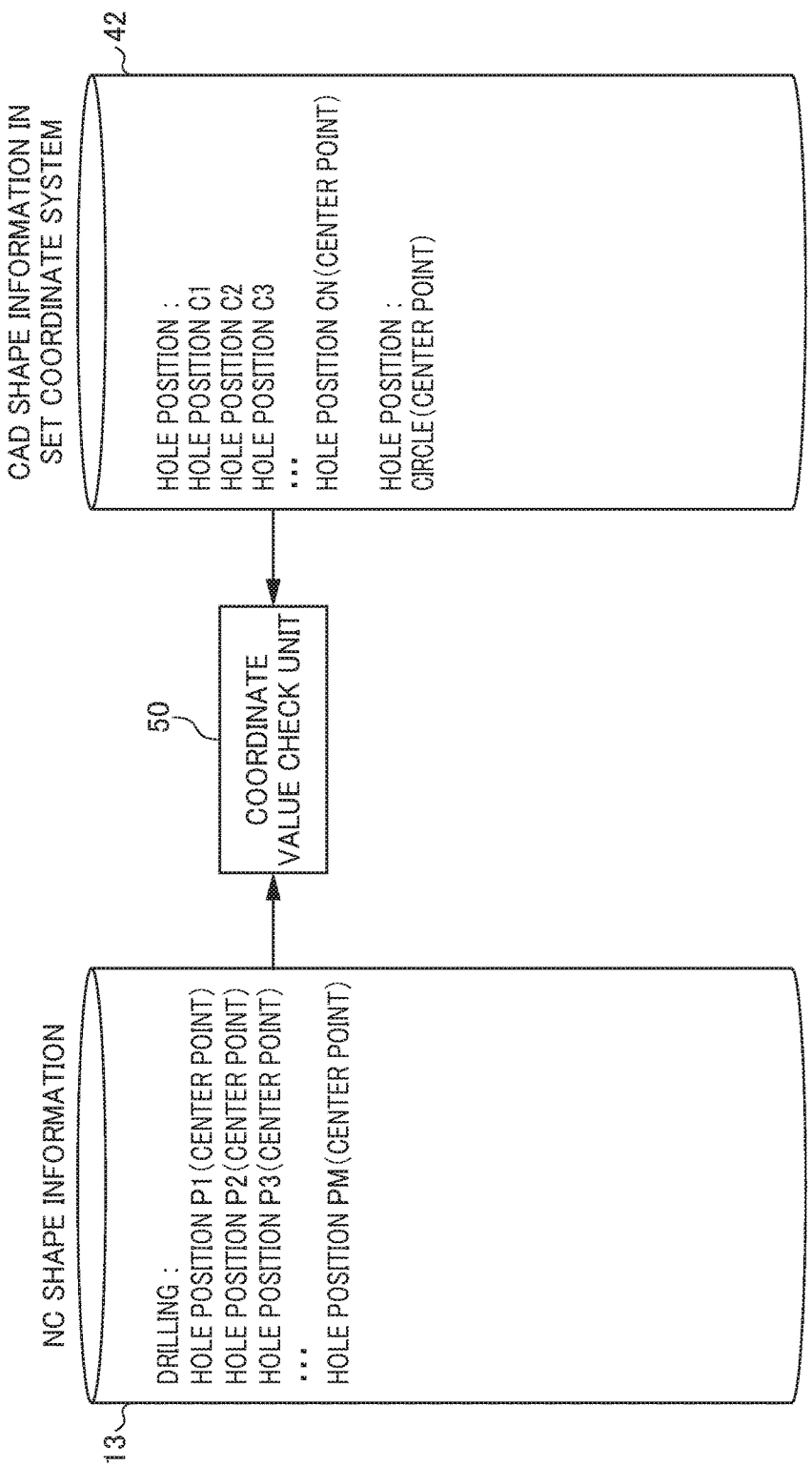

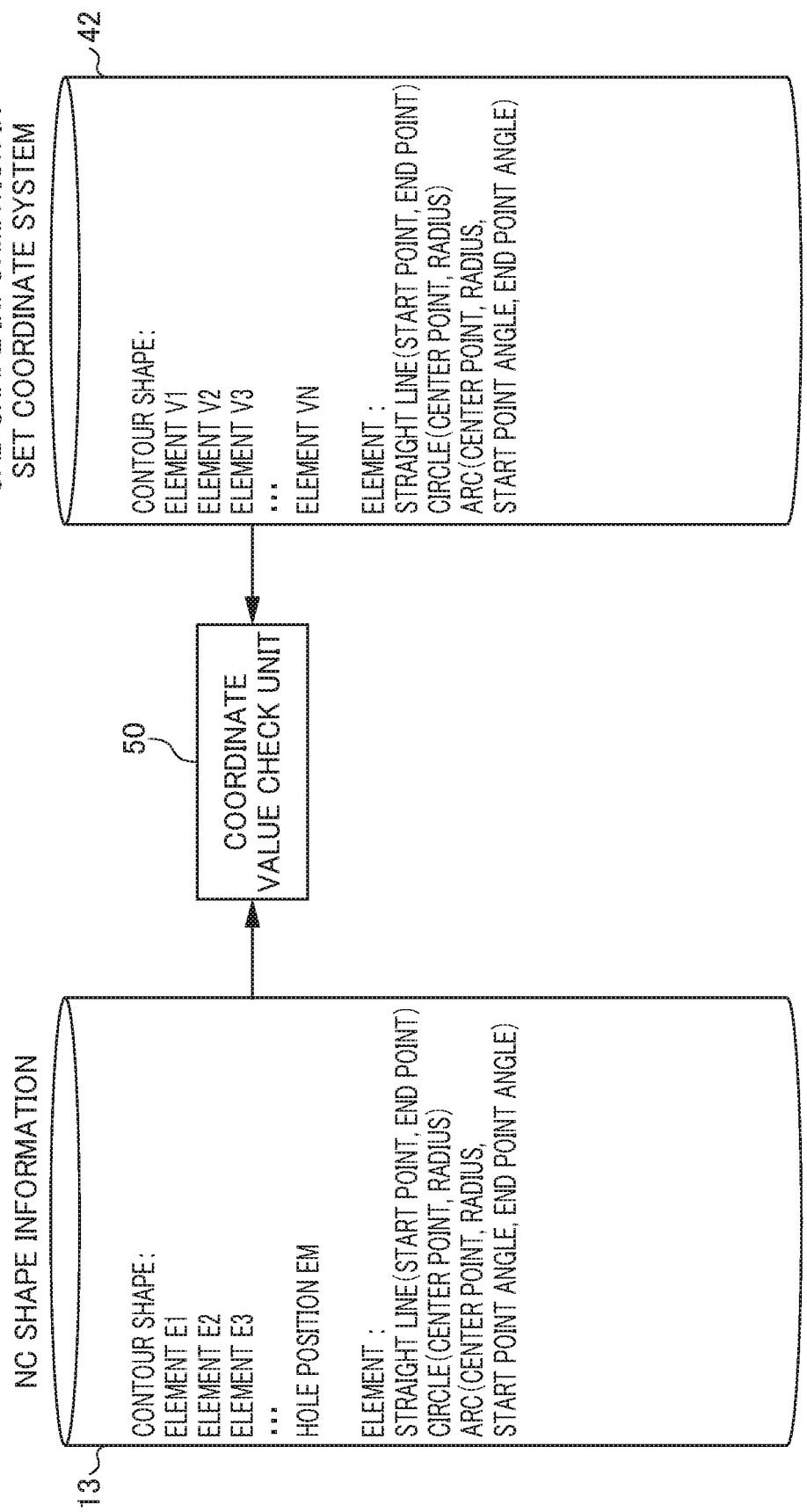

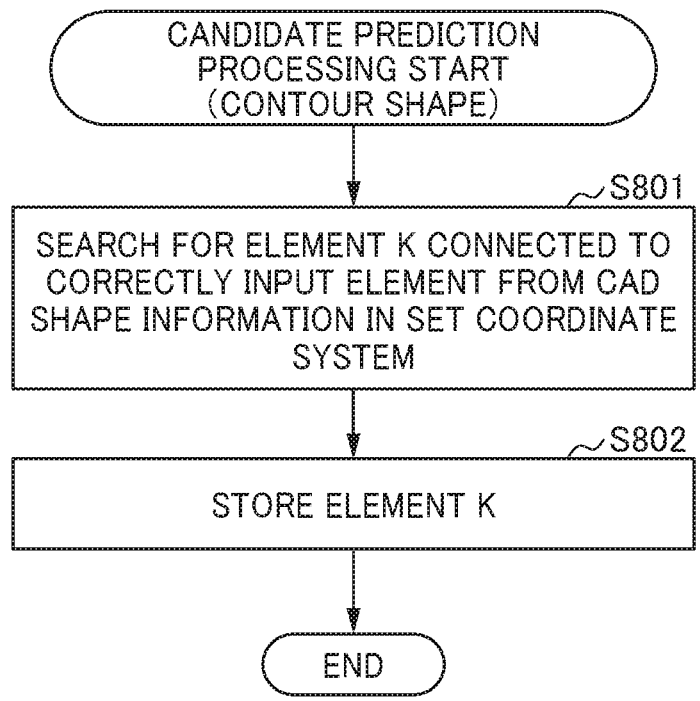
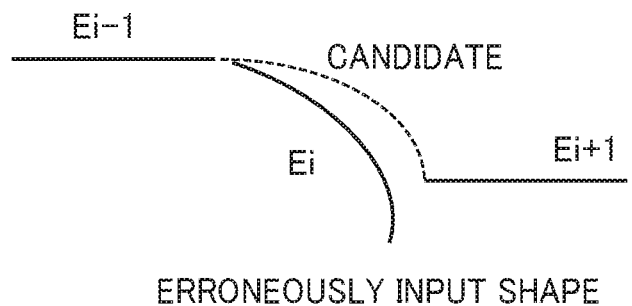

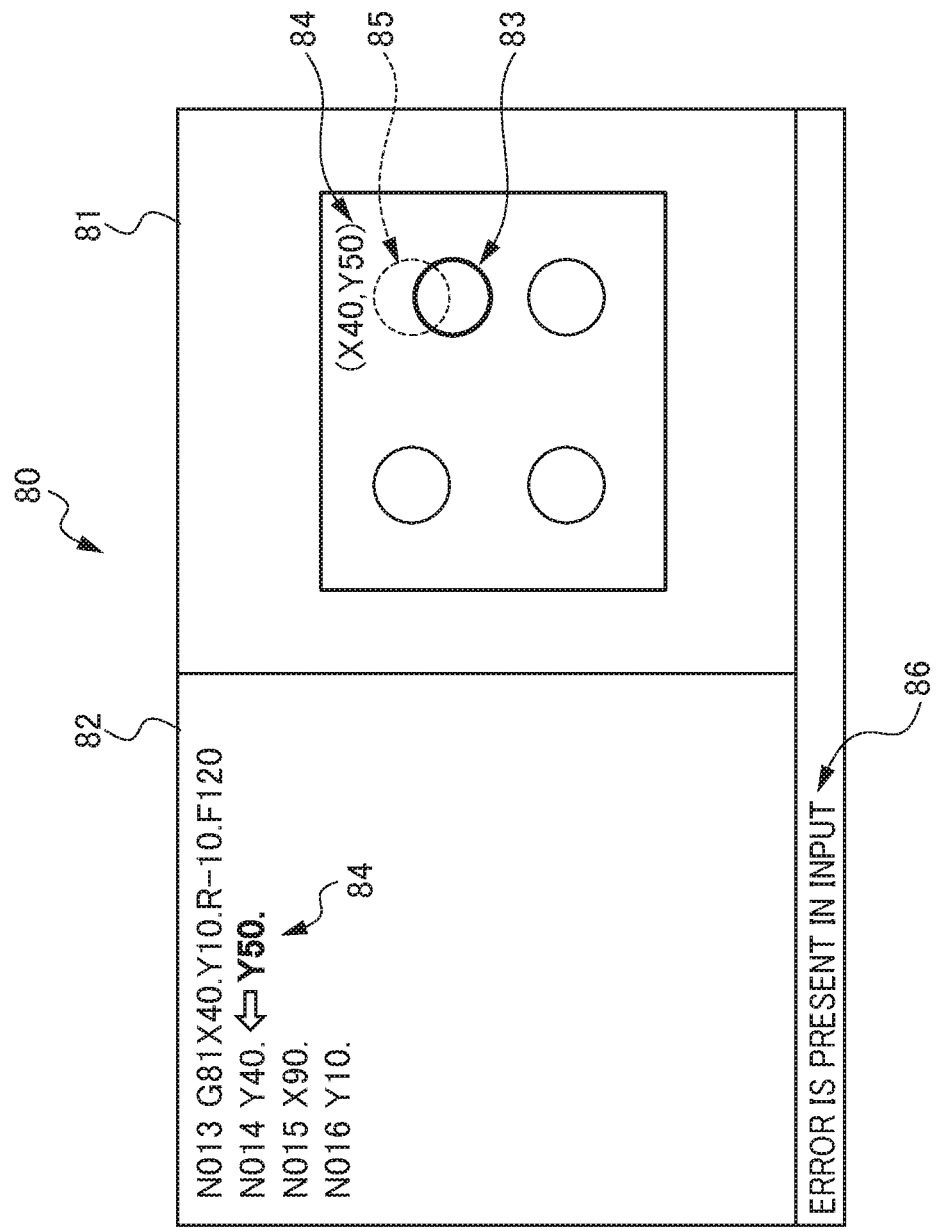

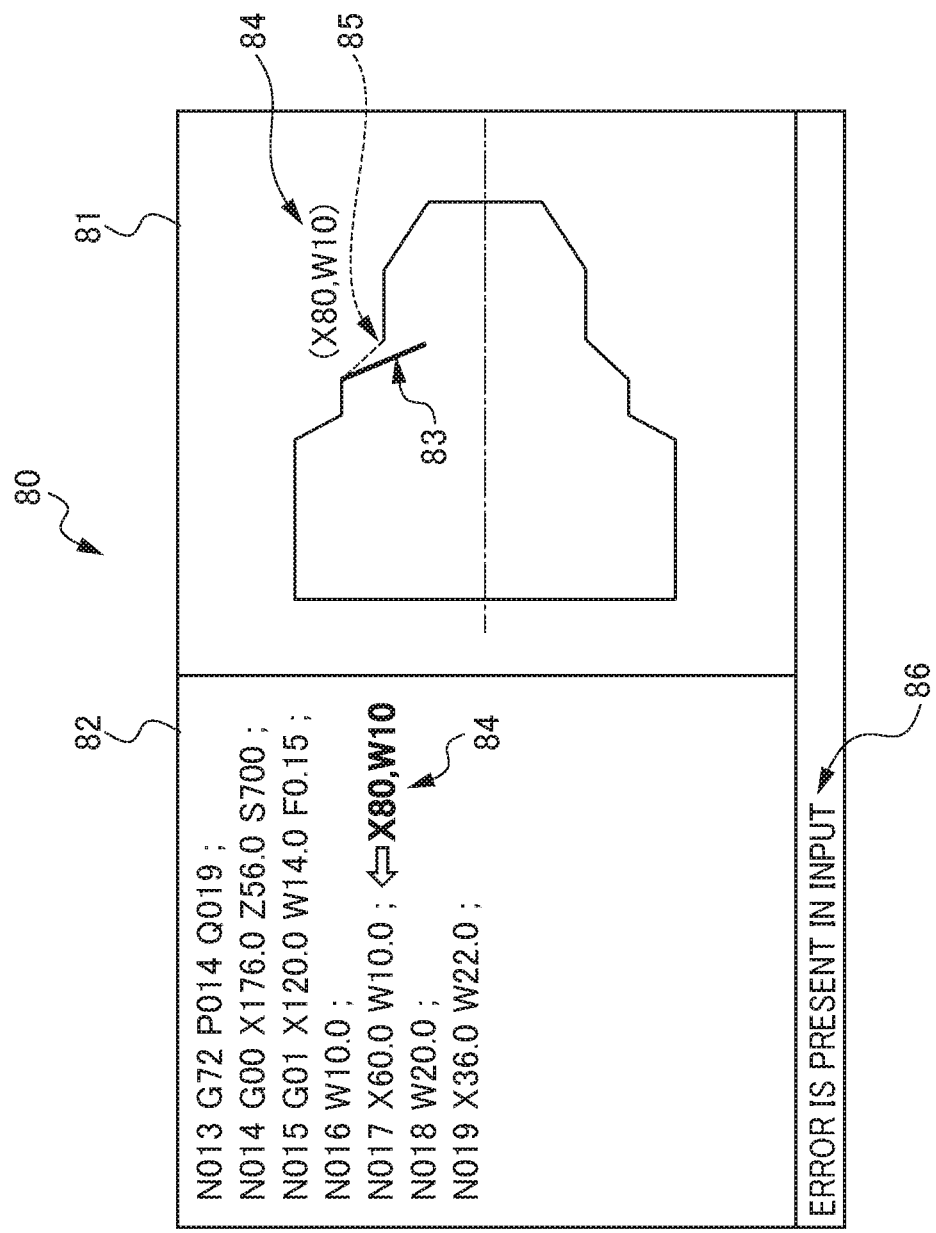

US 11,314,230 B2

MACHINING PROGRAM GENERATION SUPPORT DEVICE

This application is based on and claims the benefit of priority from Japanese Patent Application No. 2019-154765, filed on 27 Aug. 2019, the content of which is incorporated herein by reference.

BACKGROUND OF THE INVENTION

Field of the Invention

The present invention relates to machining program generation support devices.

Related Art

For example, a technology is known which generates, from the CAD (Computer Aided Design) data of a workpiece, a machining program for controlling the operation of an industrial machine such as a machine tool or an industrial robot so as to machine the workpiece (machining target). As the machining program generation technology as described above, a technology of a CAM (Computer Aided Manufacturing) which automatically generates the machining program from the CAD data or the like is known (see, for example, Patent Document 1).

Patent Document 1: Japanese Unexamined Patent Application, Publication No. H11-66112

SUMMARY OF THE INVENTION

On the other hand, in the case of simple machining, it is likely that for example, without use of a CAM, a CAD drawing is displayed on a CNC (Computer Numerical Control), and that while seeing the CAD drawing, an operator manually generates a machining program. In such a case, when all shapes (machining shapes) of a workpiece are manually input, the efficiency of such an operation is low, and thus the number of input errors is increased.

Hence, a technology is desired which can check an input error made by an operator when the operator manually generates a machining program.

A machining program generation support device according to the present disclosure is a machining program generation support device which supports the generation of a machining program for a workpiece from CAD data of the workpiece, and includes: a CAD data analysis unit which analyzes the CAD data so as to obtain CAD shape information serving as shape information of the workpiece; a machining program analysis unit which analyzes the machining program that is in the middle of being produced by an operator so as to obtain machining shape information serving as the shape information of the workpiece that is in the middle of being produced; a relative position matching unit which performs relative position matching of shapes of the CAD shape information obtained with the CAD data analysis unit and the machining shape information that is obtained with the machining program analysis unit and that is in the middle of being produced so as to obtain matching shape information and to determine, based on the matching shape information, whether or not a part of an input error of a position made by the operator is present in the machining shape information; and a display unit which displays the machining shape information obtained with the machining program analysis unit and which displays, as an error, the part of the input error determined with the relative position matching unit and made by the operator in the machining shape information.

According to the present disclosure, it is possible to check an input error made by an operator when the operator manually generates a machining program.

BRIEF DESCRIPTION OF THE DRAWINGS

FIG. 2A is a diagram showing examples of an NC program which is in the middle of being produced by an operator and shape information (NC shape information) of a workpiece which is in the middle of being produced in the NC program that is analyzed with an NC program analysis unit;

FIG. 3A is a diagram showing examples of CAD data and shape information (CAD shape information) of the workpiece which is analyzed with a CAD data analysis unit;

FIG. 4A is a diagram showing examples of the NC shape information and the CAD shape information in drilling on which relative position matching is performed with a relative position matching unit;

FIG. 6A is a diagram showing examples of the NC shape information and the CAD shape information in contouring on which shape matching is performed with the relative position matching unit;

FIG. 8A is a diagram showing examples of the NC shape information in drilling on which coordinate matching is performed with a coordinate value check unit and the CAD shape information in a coordinate system which is set with a coordinate setting unit;

FIG. 9A is a diagram showing examples of the NC shape information in contouring on which the coordinate matching is performed with the coordinate value check unit and the CAD shape information in the coordinate system which is set with the coordinate setting unit;

FIG. 12 is a flowchart showing the candidate prediction processing (contour shape) which is performed with the candidate prediction unit;

FIG. 13 is a diagram showing examples of the matching shape information in contouring, a shape which is caused by an input error of the operator and the candidate shape which is generated with the candidate prediction unit;

FIG. 16 is a diagram showing examples of a CAD data display (right side) and a program display (left side) on a display unit (drilling); and FIG. 17 is a diagram showing examples of the CAD data display (right side) and the program display (left side) on the display unit (contouring).

DETAILED DESCRIPTION OF THE INVENTION

Figure 1:
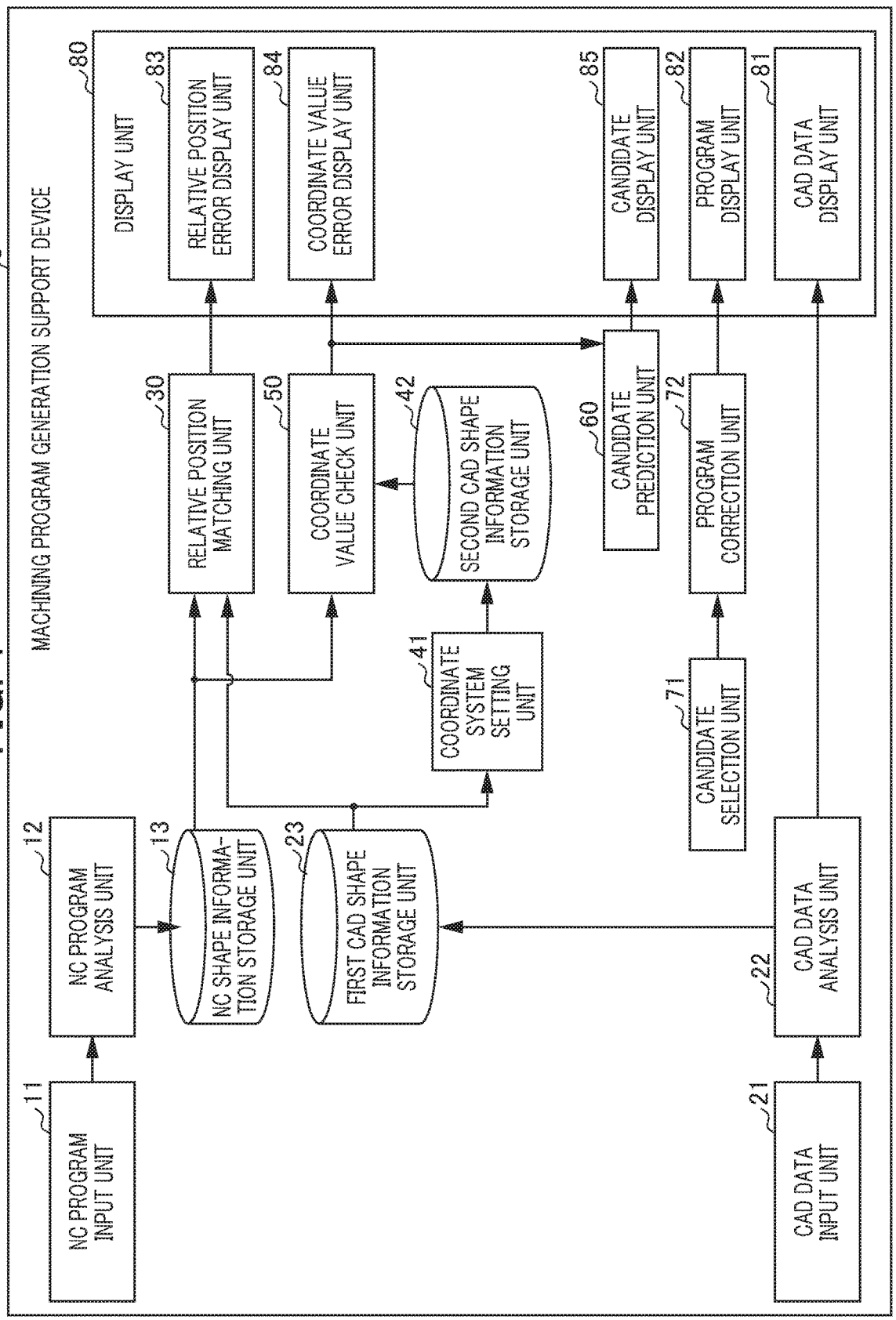
FIG. 1 is a diagram showing an embodiment of a machining program generation support device.

An example of the embodiment of the present invention will be described below with reference to accompanying drawings. In the individual drawings, the same or corresponding parts are identified with the same reference numerals.

FIG. 1 is a diagram showing an embodiment of a machining program generation support device. The machining program generation support device 1 shown in FIG. 1 is installed in, for example, the numerical controller (Computer Numerical Control: CNC) of a machine tool. The numerical controller controls the operation of the machine tool based on a machining program (hereinafter also referred to as an NC program) so as to machine a workpiece. In the case of simple machining, it is likely that for example, without use of a CAM, a CAD drawing is displayed on the numerical controller, and that while seeing the CAD drawing, an operator manually generates the machining program. When as described above, the operator manually generates the machining program, the machining program generation support device 1 checks whether or not an input error is made by the operator so as to support the generation of the machining program.

The machining program generation support device 1 includes an NC program input unit 11, an NC program analysis unit 12, an NC shape information storage unit 13, a CAD data input unit 21, a CAD data analysis unit 22, a first CAD shape information storage unit 23, a relative position matching unit 30, a coordinate system setting unit 41, a second CAD shape information storage unit 42, a coordinate value check unit 50, a candidate prediction unit 60, a candidate selection unit 71, a program correction unit 72 and a display unit 80.

The NC program input unit 11 inputs the NC program produced by the operator.

The NC program analysis unit 12 is a machining program analysis unit, and analyzes the NC program which is in the middle of being produced by the operator so as to obtain NC shape information serving as the shape information of the workpiece which is in the middle of being produced. The NC program is the machining program which is input to the NC program input unit 11 by the operator.

The NC shape information is machining shape information. In the case of drilling, as will be described later, the NC shape information includes the "coordinates of the center point of a hole position" whereas in the case of contouring, the NC shape information includes at least one of the "coordinates of the start point of a straight line and the coordinates of an end point", the "coordinates of the center point of a circle and a radius" and the "coordinates of the center point of an arc, a radius, a start point angle and an end point angle".

The NC shape information storage unit 13 stores the NC shape information which is analyzed with the NC program analysis unit 12.

The CAD data input unit 21 inputs, for example, the CAD data of the workpiece from a CAD.

The CAD data analysis unit 22 analyzes the CAD data so as to obtain CAD shape information serving as the shape information of the workpiece. In the case of drilling, as will be described later, the CAD shape information includes the "coordinates of the center point of the hole position" whereas in the case of contouring, the CAD shape information includes at least one of the "coordinates of the start point of the straight line and the coordinates of the end point", the "coordinates of the center point of the circle and the radius" and the "coordinates of the center point of the arc, the radius, the start point angle and the end point angle".

The first CAD shape information storage unit 23 stores the CAD shape information which is analyzed with the CAD data analysis unit 22.

The relative position matching unit 30 reads, from the NC shape information storage unit 13, the NC shape information obtained with the NC program analysis unit 12, reads, from the first CAD shape information storage unit 23, the CAD shape information obtained with the CAD data analysis unit 22 and performs relative position matching of shapes of the NC shape information and the CAD shape information. In this way, the relative position matching unit 30 obtains relative position matching shape information in which the relative positions of the shapes are matched. Moreover, the relative position matching unit 30 determines, based on the obtained relative position matching shape information, whether or not an input error of a position is made by the operator in the NC shape information. When the relative position matching unit 30 determines that an input error of a position is made by the operator in the NC shape information, the information of the result of the determination on the part of the input error is fed to the display unit 80.

The coordinate system setting unit 41 reads the CAD shape information obtained with the CAD data analysis unit 22 from the first CAD shape information storage unit 23, and sets the coordinate system of the CAD shape information for the CAD shape information. Specifically, the coordinate system setting unit 41 sets, for the CAD shape information, an XY coordinate system and an origin point on the CAD data display unit 81 of the display unit 80 which will be described later.

The second CAD shape information storage unit 42 stores the CAD shape information in the coordinate system set with the coordinate system setting unit 41.

The coordinate value check unit 50 reads, from the NC shape information storage unit 13, the NC shape information obtained with the NC program analysis unit 12, and reads, from the second CAD shape information storage unit 42, the CAD shape information in the coordinate system set with the coordinate system setting unit 41 so as to perform matching of the coordinates of the NC shape information and the coordinates of the CAD shape information, and thereby obtains matching coordinate information in which the coordinates are matched (the CAD shape information on which matching is performed). Moreover, the coordinate value check unit 50 determines, based on the obtained matching coordinate information, whether or not an input error of a coordinate value is made by the operator in the NC shape information. When the coordinate value check unit 50 determines that an input error of a coordinate value is made by the operator in the NC shape information, the information of the result of the determination on the coordinate value in the input error is fed to the display unit 80.

The candidate prediction unit 60 predicts, based on the CAD shape information in the coordinate system set with the coordinate system setting unit 41, a candidate shape following the matching coordinate information obtained with the coordinate value check unit 50 so as to predict the candidate shape following the NC shape information which is in the middle of being produced, and automatically generates candidate shape information including a coordinate value. The prediction of the candidate shape with the candidate prediction unit 60 can be performed, for example, when the coordinate value check unit 50 determines that an input error of a coordinate value is made by the operator in the NC shape information. The candidate shape information predicted with the candidate prediction unit 60 indicates a coordinate value and a position indicated by the coordinate value which are assumed to be correct instead of the coordinate value and the position indicated by the coordinate value that are erroneously input by the operator in the NC shape information which is in the middle of being produced. The candidate shape information generated with the candidate prediction unit 60 is fed to the display unit 80.

The candidate selection unit 71 is configured such that the candidate shape information generated with the candidate prediction unit 60 can be selected and input by the operator. For example, the candidate selection unit 71 can be set on the screen of the display unit 80 on which the candidate shape information is displayed. In this way, the operator can directly select and input the candidate shape information displayed on the screen of the display unit 80.

The program correction unit 72 automatically corrects, based on the candidate shape information selected and input with the candidate selection unit 71 by the operator, the NC program which is in the middle of being produced by the operator, and reflects, on the NC program, the candidate shape information selected and input with the candidate selection unit 71. The NC program after being corrected with the program correction unit 72 is fed to the display unit 80.

The display unit 80 is a display device such as a liquid crystal display. As shown in FIG. 1, the display unit 80 of the present embodiment includes at least the CAD data display unit 81, a program display unit 82, a relative position error display unit 83, a coordinate value error display unit 84 and a candidate display unit 85.

Here, the display unit 80 will be described with reference to FIGS. 16 and 17. FIG. 16 is a diagram showing examples of a CAD data display (right side) and a program display (left side) on the display unit 80 (drilling). FIG. 17 is a diagram showing examples of the CAD data display (right side) and the program display (left side) on the display unit 80 (contouring).

The CAD data display unit 81 is set in a rectangular region on the right half of the screen of the display unit 80. The CAD data display unit 81 displays the CAD data (CAD drawing) of the workpiece which is analyzed with the CAD data analysis unit 22. In this way, the operator can manually generate the NC program while seeing the CAD data display unit 81.

The program display unit 82 is set in a rectangular region on the left half of the screen of the display unit 80. The program display unit 82 displays the NC program which is in the middle of being produced by the operator. When the NC program is corrected with the program correction unit 72, the program display unit 82 can also display the NC program after being corrected.

The relative position error display unit 83 is set on the CAD data display unit 81. The relative position error display unit 83 displays, as an error, the information of the result of the determination when the relative position matching unit 30 determines that an input error of a position is made by the operator in the NC shape information such that the information overlaps the CAD data displayed on the CAD data display unit 81.

The display of an error with the relative position error display unit 83 is preferably performed such that the part of the input error of the position made by the operator can easily be distinguished from the other parts. The display of an error with the relative position error display unit 83 may be, for example, highlighting. Examples of a specific highlighting method include a method of displaying the part of the input error in a color different from colors of the other parts (for example, red or yellow), a method of blinking the part of the input error and a method of indicating the part of the input error with an arrow. In this way, the operator can easily recognize, on the screen, that the error of the position occurs in the shape information of the NC program which is in the middle of being produced.

The coordinate value error display unit 84 is set on the program display unit 82. The coordinate value error display unit 84 displays, as an error, the result of the determination when the coordinate value check unit 50 determines that an input error of a coordinate value is made by the operator in the NC shape information such that the result overlaps the NC program which is displayed on the program display unit 82 and which is in the middle of being produced.

The display of an error with the coordinate value error display unit 84 is preferably performed such that the part of the input error of the coordinate value made by the operator in the NC shape information can easily be distinguished from the other parts. For example, the display of an error with the coordinate value error display unit 84 may be highlighting which is performed in the same method as the display of an error with the relative position error display unit 83. In this way, the operator can easily recognize, on the screen, that the error of the coordinate value occurs in the NC program which is in the middle of being produced.

The candidate display unit 85 is set both on the CAD data display unit 81 and on the program display unit 82. The candidate display unit 85 displays a coordinate value in the candidate shape information generated with the candidate prediction unit 60 and a shape indicated by the coordinate value such that the coordinate value and the shape overlap the NC shape information which is displayed on the program display unit 82 and which is in the middle of being produced and the CAD data which is displayed on the CAD data display unit 81. The candidate shape information predicted with the candidate prediction unit 60 indicates a coordinate value and a shape which are assumed to be correct instead of the coordinate value that are erroneously input by the operator and a shape indicated by the coordinate value in the NC shape information which is in the middle of being produced. As a specific candidate display method, a method of displaying a candidate coordinate value indicating the candidate shape information or a candidate position by the same method as the highlighting illustrated above is mentioned. As shown in FIGS. 16 and 17, the candidate display unit 85 may display the candidate of the coordinate value such that the candidate overlaps the CAD data displayed on the CAD data display unit 81.

As shown in FIGS. 16 and 17, the display unit 80 can further include, for example, in a lower portion of the screen, a character string display unit 86 which displays, with a character string, that an input error is made by the operator.

The machining program generation support device 1 (except the NC shape information storage unit 13, the first CAD shape information storage unit 23, the second CAD shape information storage unit 42 and the display unit 80) is formed with, for example, a computation processor such as a DSP (Digital Signal Processor) or an FPGA (Field-Programmable Gate Array). Various types of functions of the machining program generation support device 1 (except the NC shape information storage unit 13, the first CAD shape information storage unit 23, the second CAD shape information storage unit 42 and the display unit 80) can be realized, for example, by execution of predetermined software (program, application) stored in the storage unit. The various types of functions of the machining program generation support device 1 (except the NC shape information storage unit 13, the first CAD shape information storage unit 23, the second CAD shape information storage unit 42 and the display unit 80) may be realized by the cooperation of hardware and software or may be realized only by hardware (electronic circuit).

As the NC shape information storage unit 13, the first CAD shape information storage unit 23 and the second CAD shape information storage unit 42, for example, a rewritable memory such as an EEPROM or a rewritable disk such as a HDD (Hard Disk Drive) or an SSD (Solid State Drive) can be used.

The operation of the machining program generation support device 1 will then be described. The machining program generation support device 1 first displays, on the CAD data display unit 81 of the display unit 80, the CAD data of the workpiece (that is, the CAD drawing of the workplace) which is input. Then, the operator manually produces (inputs), based on the CAD drawing of the workpiece displayed on the CAD data display unit 81, the NC program with the NC program input unit 11. The machining program generation support device 1 displays, on the program display unit 82 of the display unit 80, the NC program which is in the middle of being produced (input) by the operator. The operations of the individual units of the machining program generation support device 1 will be described in detail below.

(NC Program Analysis)

Figure 2B:
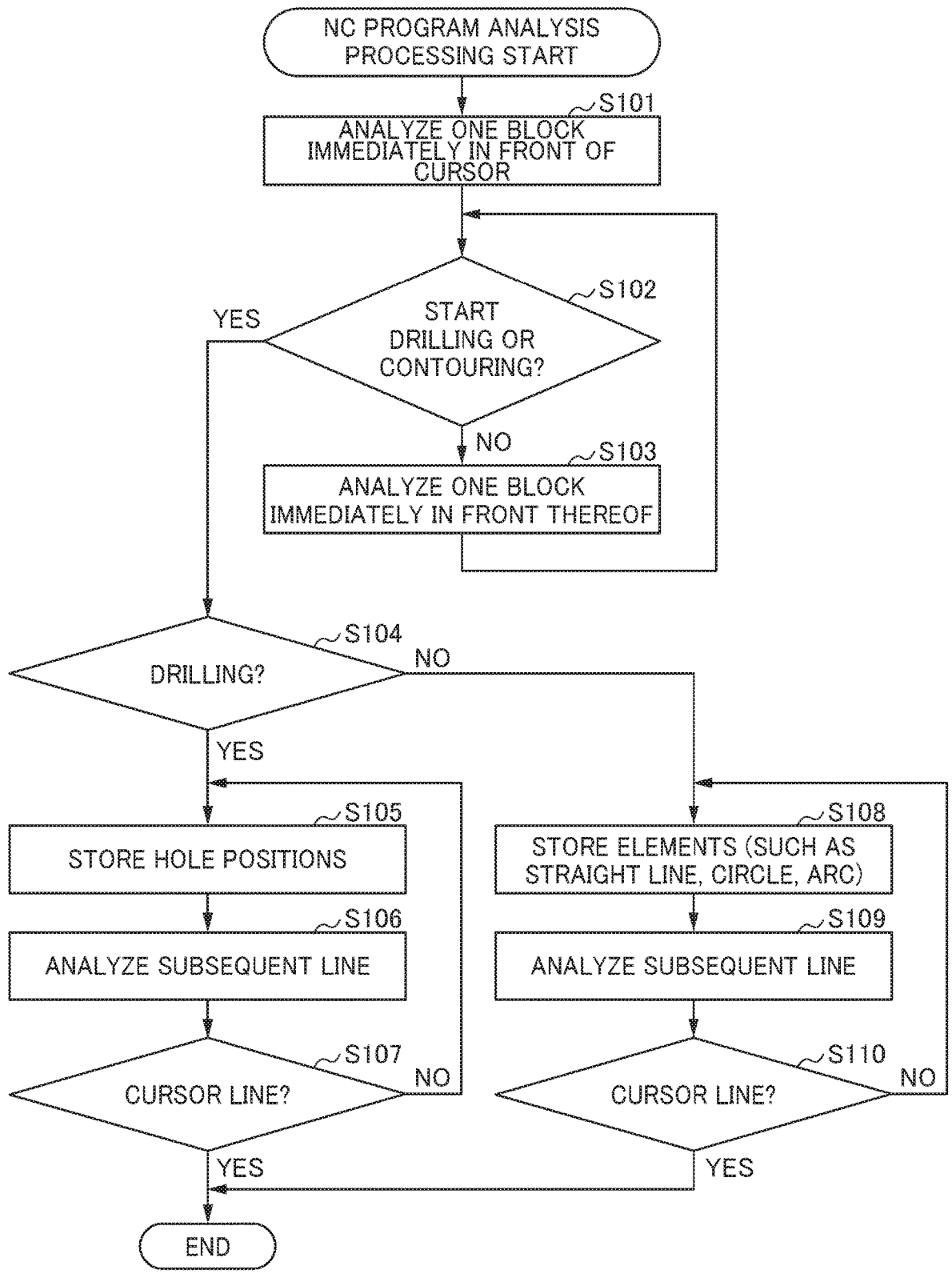
FIG. 2B is a flowchart showing NC program analysis processing which is performed with the NC program analysis unit.

FIG. 2A is a diagram showing examples of the NC program which is in the middle of being produced by the operator and the shape information (hereinafter also referred to as the NC shape information) of the workpiece which is in the middle of being produced in the NC program that is analyzed with the NC program analysis unit. FIG. 2B is a flowchart showing NC program analysis processing which is performed with the NC program analysis unit.

The NC program analysis unit 12 first analyzes one block immediately in front of a cursor in the NC program which is displayed on the program display unit 82 and which is in the middle of being produced by the operator (S101). The NC program analysis unit 12 determines, for example, based on a G-code command, whether or not a machining command is the start of drilling or contouring (for example, an end face rough cutting cycle) (S102). For example, when the G-code command is "G81", the NC program analysis unit 12 determines that the machining command is the start of drilling whereas when the G-code command is "G72", the NC program analysis unit 12 determines that the machining command is the start of contouring.

When in step S102, the machining command is neither the start of drilling nor the start of contouring, the NC program analysis unit 12 analyzes one block immediately in front thereof, that is, the subsequent block (S103), and returns to step S102. As described above, the NC program analysis unit 12 analyzes the NC program which is in the middle of being produced on a block-by-block basis.

When in step S102, the machining command is either the start of drilling or the start of contouring, the NC program analysis unit 12 determines whether or not the machining command is drilling (S104). When the machining command is drilling, the NC program analysis unit 12 stores the first hole position following the machining command in the NC shape information storage unit 13 as the NC shape information (S105).

Then, the NC program analysis unit 12 analyzes the subsequent line (S106) so as to determine whether or not the subsequent line is a cursor line, that is, whether or not the analysis of all shape blocks is completed (S107). When the subsequent line is not the cursor line, the NC program analysis unit 12 returns to step S105 so as to repeat processing from step S105 to step S107. On the other hand, when the subsequent line is the cursor line, the NC program analysis unit 12 completes the analysis.

In this way, in the case of drilling, the NC program analysis unit 12 obtains, as the NC shape information, hole positions P1, P2, P3, . . . and PM which are produced (input) by the operator. The hole positions are, for example, the center points. Here, M is an arbitrary integer which is equal to or greater than 2 and less than N (N will be described later).

On the other hand, when in step S104, the machining command is not drilling, that is, when the machining command is contouring, the NC program analysis unit 12 stores, as the NC shape information, the first element following the machining command in the NC shape information storage unit 13 (S108). Examples of the element include a straight line "G01", a circle "G02", an arc "G03" and the like. In the case of the straight line "G01", the start point or the straight line and the end point of the straight line are included. In the case of the circle "G02", the center point of the circle and the radius of the circle are included. In the case of the arc "G03", the center point of the arc, the radius of the arc, the start point angle of the arc and the end point angle of the arc are included.

Then, the NC program analysis unit 12 analyzes the subsequent line (S109) so as to determine whether or not the subsequent line is the cursor line, that is, whether or not the analysis of all shape blocks is completed (S110). When the subsequent line is not the cursor line, the NC program analysis unit 12 returns to step S108 so as to repeat processing from step S108 to step S110. On the other hand, when the subsequent line is the cursor line, the NC program analysis unit 12 completes the analysis.

In this way, in the case of contouring, the NC program analysis unit 12 obtains, as the NC shape information, elements E1, E2, E3, . . . and EM which are produced (input) by the operator. Here, M is an arbitrary integer which is equal to or greater than 2 and less than N (N will be described later). Examples of the element include, as described above, a straight line, a circle, an arc and the like.

(CAD Data Analysis)

Figure 3B:
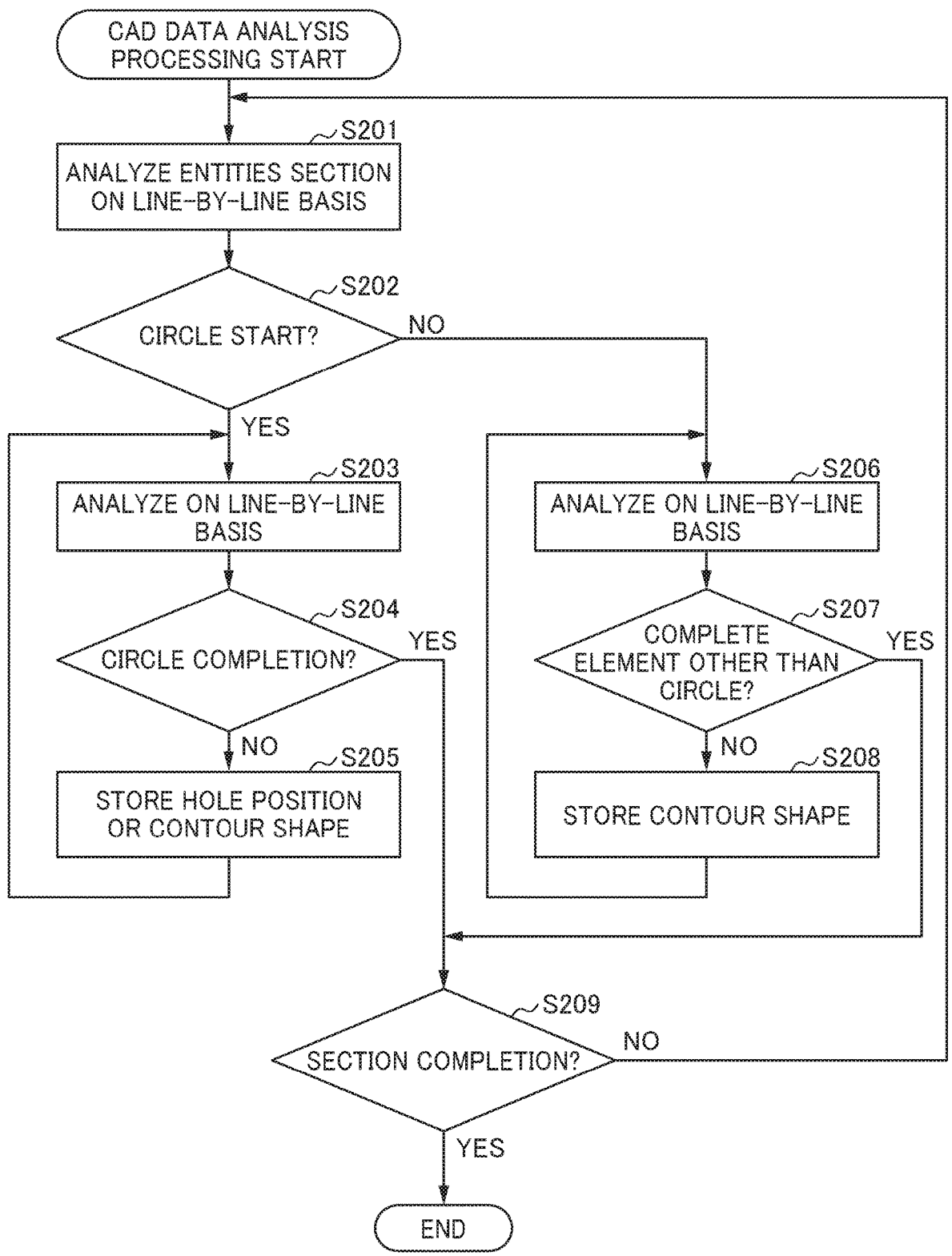
FIG. 3B is a flowchart showing CAD data analysis processing which is performed with the CAD data analysis unit.

FIG. 3A is a diagram showing examples of the CAD data (CAD file) and the shape information (hereinafter also referred to as the CAD shape information) of the workpiece which is analyzed with the CAD data analysis unit. FIG. 3B is a flowchart showing CAD data analysis processing which is performed with the CAD data analysis unit.

The CAD data analysis unit 22 first analyzes ENTITIES SECTION (component object) in the CAD data on a line-by-line basis (S201) so as to determine whether or not ENTITIES SECTION is the start of CIRCLE, that is, whether or not ENTITIES SECTION is the start of a circular shape (S202). When ENTITIES SECTION is the start of CIRCLE, the CAD data analysis unit 22 analyzes this SECTION in the CAD data on a line-by-line basis (S203) so as to determine whether or not ENTITIES SECTION is the completion of CIRCLE, that is, whether or not ENTITIES SECTION is the completion of the circular shape (S204). When ENTITIES SECTION is not the completion of CIRCLE, the CAD data analysis unit 22 stores, as the CAD shape information, the hole positions or a contour shape in the first CAD shape information storage unit 23 (S205). Thereafter, the CAD data analysis unit 22 returns to step S203 so as to repeat processing from step S203 to step S205.

In this way, in the case of the hole positions, the CAD data analysis unit 22 obtains, as the CAD shape information, hole positions C1, C2, C3, . . . and CN in the CAD data. The hole positions are, for example, the center points. Here, N is an arbitrary integer which is equal to or greater than 2 (N>M).

In the case of the contour shape, the CAD data analysis unit 22 obtains, as the CAD shape information, elements V1, V2, V3, . . . and VN in the CAD data. Here, N is an arbitrary integer which is equal to or greater than 2 (N>M). Examples of the element include, as described above, a straight line, a circle, an arc and the like.

On the other hand, when in step S202, ENTITIES SECTION is not the start of CIRCLE, that is, ENTITIES SECTION is the start of an element other than CIRCLE, the CAD data analysis unit 22 analyzes this SECTION in the CAD data on a line-by-line basis (S206) so as to determine whether or not ENTITIES SECTION is the completion of the element other than CIRCLE (S207). When ENTITIES SECTION is not the completion of the element other than CIRCLE, the CAD data analysis unit 22 stores, as the CAD shape information, the contour shape in the first CAD shape information storage unit 23 (S208). Thereafter, the CAD data analysis unit 22 returns to step S206 so as to repeat processing from step S206 to step S208.

In this way, the CAD data analysis unit 22 obtains, as the CAD shape information, elements V1, V2, V3, . . . and VN in the CAD data.

When in step S204, ENTITIES SECTION is the completion of CIRCLE, and in step S207, ENTITIES SECTION is the completion of the element other than CIRCLE, the CAD data analysis unit 22 determines whether or not ENTITIES SECTION is completed in the CAD data (S209). When ENTITIES SECTION is not completed, the CAD data analysis unit 22 returns to step S201 so as to perform processing from step S201 to step S209 on the subsequent ENTITIES SECTION. On the other hand, when ENTITIES SECTION is completed, the CAD data analysis unit 22 completes the analysis processing.

(Relative Position Matching; Hole Positions)

Figure 4B:
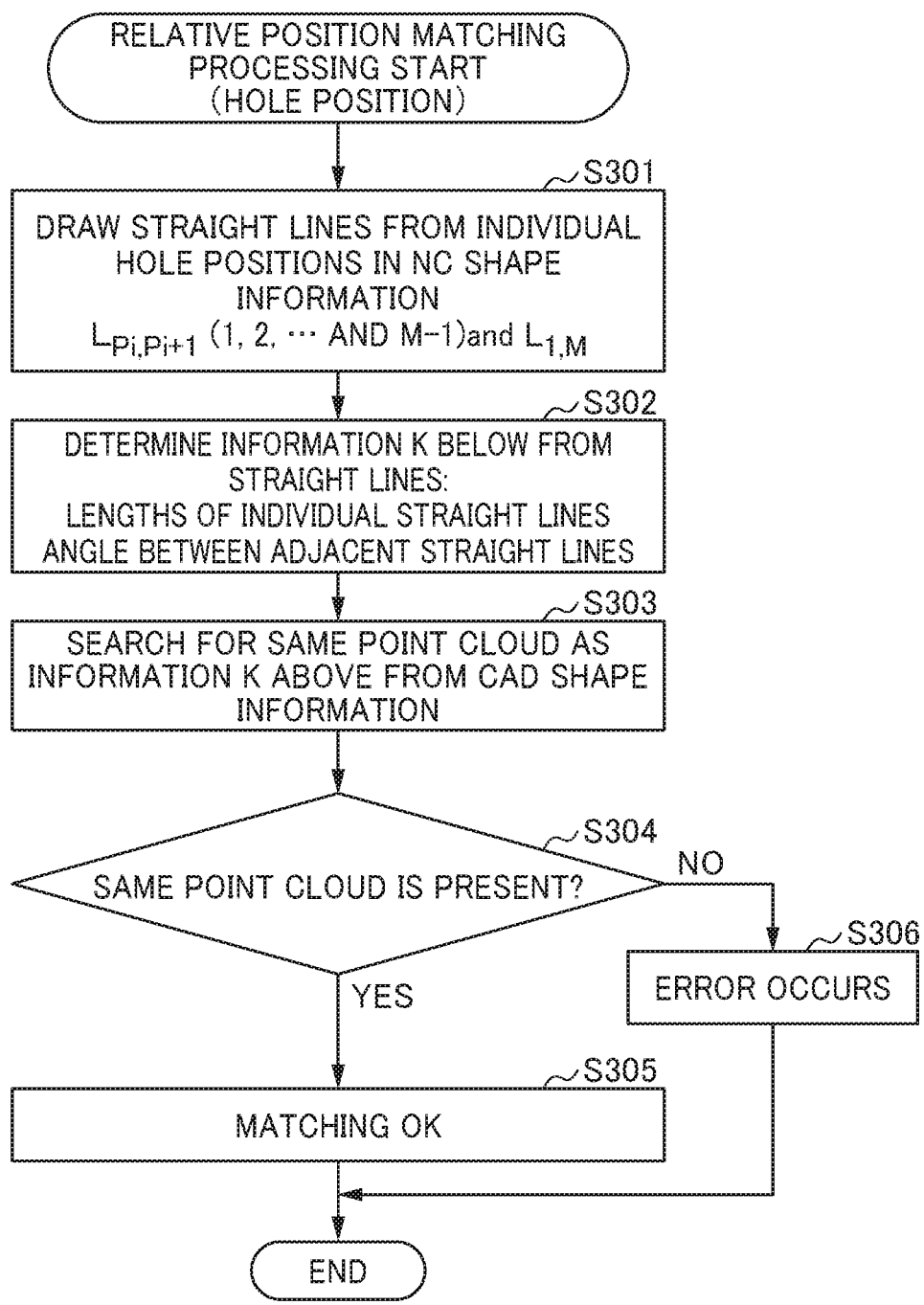
FIG. 4B is a flowchart showing relative position matching processing (hole positions) which is performed with the relative position matching unit.
Figure 5:
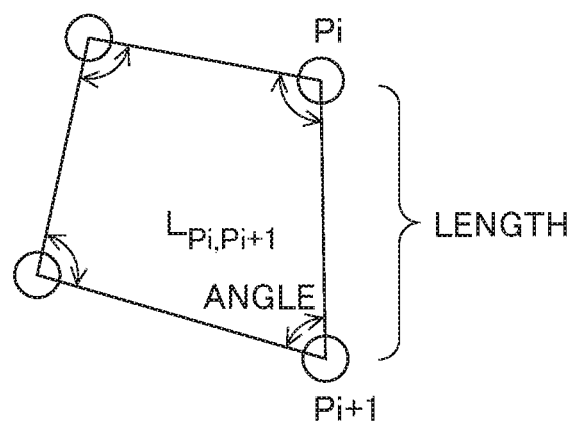
FIG. 5 is a diagram showing an example of hole positions on which the relative position matching processing (hole positions) is performed with the relative position matching unit.

FIG. 4A is a diagram showing examples of the NC shape information and the CAD shape information in drilling on which the relative position matching is performed with the relative position matching unit. FIG. 4B is a flowchart showing relative position matching processing (hole positions) which is performed with the relative position matching unit. FIG. 5 is a diagram showing an example of hole positions on which the relative position matching processing (hole positions) is performed with the relative position matching unit.

As shown in FIG. 4A, in the NC shape information storage unit 13, as hole positions (center points) produced by the operator, the hole positions P1, P2, P3, . . . and PM are stored.

The relative position matching unit 30 first draws, from the individual hole positions of the NC shape information read from the NC shape information storage unit 13, straight lines L connecting the center points of the hole positions (S301). Processing which draws the straight lines L is performed on the individual hole positions adjacent to each other. The straight lines L connecting the center points of all the hole positions are formed, and thus as shown in FIG. 5, a polygon is formed which indicates the relative positions of a plurality of hole positions. The hole positions are respectively arranged at the vertices of the polygon.

Then, the relative position matching unit 30 determines information K from the straight lines L formed in step S301 (S302). The information K refers to the information of the lengths of the individual straight lines L and the information of the angles between the individual straight lines L adjacent to each other.

After determining the information K, the relative position matching unit 30 searches for, from the CAD shape information read from the first CAD shape information storage unit 23, a point cloud which forms a set of hole positions (center points) satisfying the information K (S303) so as to determine whether or not the same point cloud is present in the CAD shape information (S304). When the same point cloud is present in the CAD shape information, the relative position matching unit 30 determines that the relative position matching is OK (correct) (S305) and completes the relative position matching processing.

On the other hand, when in step S304, the same point cloud is not present in the CAD shape information, the relative position matching unit 30 determines that an input error is made by the operator in the hole position of the NC shape information which is in the middle of being produced by the operator. Thereafter, the relative position matching unit 30 feeds, to the display unit 80, information on the result of the determination including the information of the hole position in which the input error occurs and completes the relative position matching processing.

The shape information of the hole position of the input error which is fed to the display unit 80 is displayed, as shown in FIG. 16, on the display unit 80 with the relative position error display unit 83. For example, the relative position error display unit 83 highlights the hole position by making the hole position overlap the CAD data of the CAD data display unit 81.

(Relative Position Matching; Contour Shape)

Figure 6B:
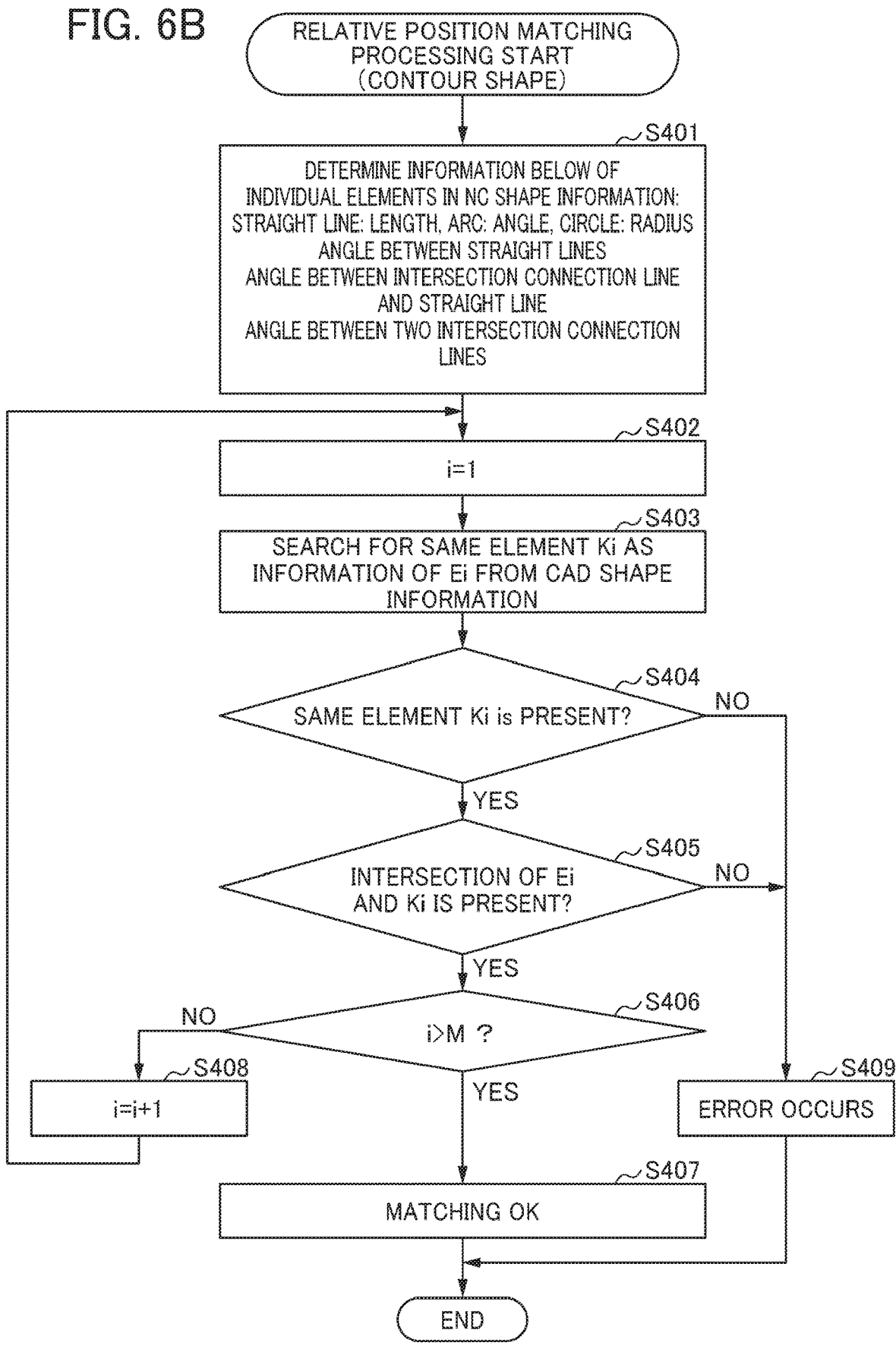
FIG. 6B is a flowchart showing the relative position matching processing (contour shape) which is performed with the relative position matching unit.

FIG. 6A is a diagram showing examples of the NC shape information and the CAD shape information in contouring on which shape matching is performed with the relative position matching unit. FIG. 6B is a flowchart showing the relative position matching processing (contour shape) which is performed with the relative position matching unit. FIGS. 7A to 7D are diagrams individually showing examples of the contour shape on which the relative position matching processing (contour shape) is performed with the relative position matching unit.

Figure 7A:
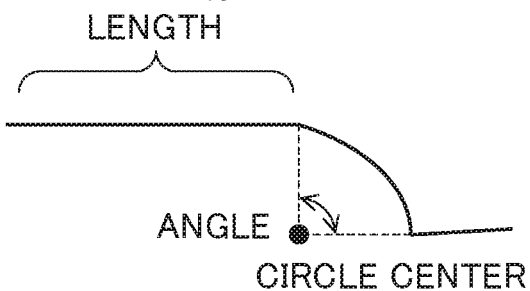
FIG. 7A is a diagram showing an example of the contour shape on which the relative position matching processing (contour shape) is performed with the relative position matching unit.
Figure 7B:
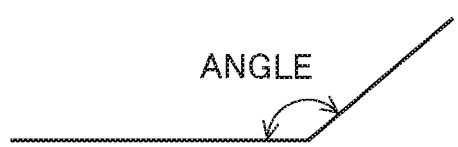
FIG. 7B is a diagram showing another example of the contour shape on which the relative position matching processing (contour shape) is performed with the relative position matching unit.
Figure 7C:
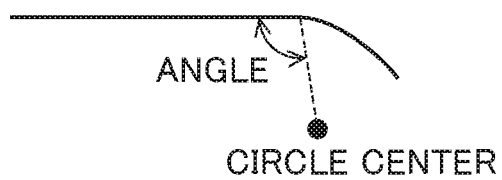
FIG. 7C is a diagram showing yet another example of the contour shape on which the relative position matching processing (contour shape) is performed with the relative position matching unit.
Figure 7D:
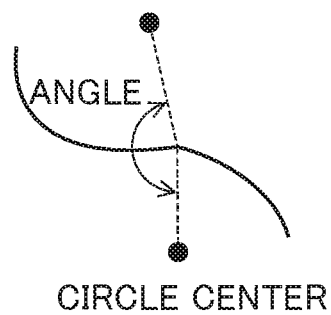
FIG. 7D is a diagram showing still another example of the contour shape on which the relative position matching processing (contour shape) is performed with the relative position matching unit.

The relative position matching unit 30 first determines, from the NC shape information read from the NC shape information storage unit 13, the following information on M elements E (S401). Straight line: length (FIG. 7A)
Arc: angle (FIG. 7A)
Circle: radius
Angle between straight lines (FIG. 7B)
Angle between intersection connection line connecting circle center and connection point and straight line (FIG. 7C)
Angle between intersection connection lines connecting two circle centers and two connection points (FIG. 7D)

After determining the information described above, the relative position matching unit 30 sets the number of times of repetition processing i such that i=1 (S402). Then, the relative position matching unit 30 searches for, from the CAD shape information read from the first CAD shape information storage unit 23, an element Ki which has the same information as an element Ei determined in step S401 (S403) so as to determine whether or not the element Ki having the same information as the element Ei is present in the CAD shape information (S404). When the element Ki having the same information as the element Ei is present in the CAD shape information, the relative position matching unit 30 determines whether or not an intersection of the element Ei and the element Ki is present (S405), and when an intersection of the element Ei and the element Ki is present, the relative position matching unit 30 then determines whether or not i>M (S406). When i>M, the relative position matching unit 30 determines that the relative position matching is OK (correct) (S407) and completes the relative position matching processing.

When in step S406, i≤M, the relative position matching unit 30 increments the number of times of repetition processing i (S408) and returns to step S402. Thereafter, the relative position matching unit 30 repeats processing from step S402 to step S408.

On the other hand, when in step S404, the element Ki having the same information as the element Ei is not present in the CAD shape information or when in step 405, an intersection of the element Ei and the element Ki is not present, the relative position matching unit 30 determines that an input error is made by the operator in the position of the contour shape in the NC shape information which is in the middle of being produced by the operator (S409). Thereafter, the relative position matching unit 30 feeds, to the display unit 80, information on the result of the determination including the information of the position of the contour shape in which the input error occurs, and completes the relative position matching processing.

The information of the contour shape of the input error which is fed to the display unit 80 is displayed, as shown in FIG. 17, on the display unit 80 with the relative position error display unit 83. For example, the relative position error display unit 83 highlights the contour shape by making the contour shape overlap the CAD data of the CAD data display unit 81.

As described above, the machining program generation support device 1 includes the relative position matching unit 30, and thereby can determine whether or not an input error is made by the operator on the hole position or the contour shape in the NC shape information which is in the middle of being produced by the operator. The relative position matching unit 30 performs relative position matching of shapes of the CAD shape information which is obtained with the CAD data analysis unit 22 and the NC shape information which is obtained with the NC program analysis unit 12 and which is in the middle of being produced. As a result, the relative position matching unit 30 determines whether or not an input error of a position is made by the operator in the NC shape information. Therefore, the machining program generation support device 1 can check an input error made by the operator without setting a coordinate system.

(Coordinate Value Check; Hole Positions)

Figure 8B:
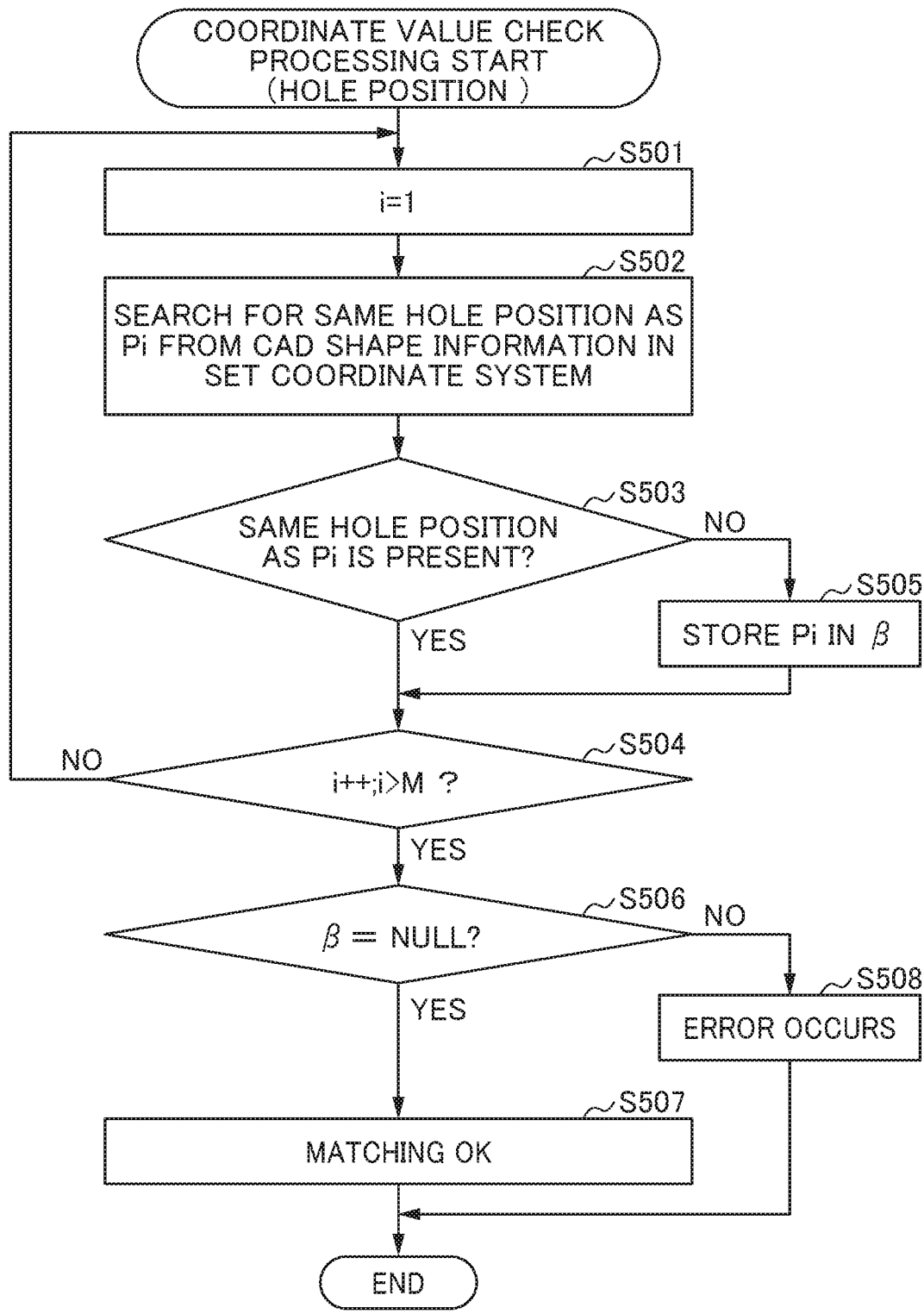
FIG. 8B is a flowchart showing coordinate value check processing (hole positions) which is performed with the coordinate value check unit.

FIG. 8A is a diagram showing examples of the NC shape information in drilling on which coordinate matching is performed with the coordinate value check unit and the CAD shape information in a coordinate system which is set with a coordinate setting unit. FIG. 8B is a flowchart showing coordinate value check processing (hole positions) which is performed with the coordinate value check unit.

The coordinate value check unit 50 first sets the number of times of repetition processing i such that i=1 (S501). Then, the coordinate value check unit 50 reads, from the second CAD shape information storage unit 42, the CAD shape information in the coordinate system which is set, searches for, from the CAD shape information, a hole position in the same coordinates as a hole position Pi in the NC shape information (S502) so as to determine whether or not the hole position in the same coordinates as the hole position Pi in the NC shape information is present in the CAD shape information (S503). Information on the CAD shape information related to the hole position in the same coordinates as the hole position Pi in the NC shape information is the matching coordinate information.

When in step S503, the hole position in the same coordinates as the hole position Pi in the NC shape information is present in the CAD shape information, the coordinate value check unit 50 increments the number of times of repetition processing i and determines whether or not i>M (S504). When i≤M, the coordinate value check unit 50 returns to step S501 so as to repeat processing from step S501 to step S504. When in step S503, the hole position in the same coordinates as the hole position Pi in the NC shape information is not present in the CAD shape information, the coordinate value check unit 50 stores the information of the hole position Pi in a predetermined storage region (β) (S505), and transfers to step S504. The information of the hole position Pi stored in this way is the information of the hole position which is assumed to be erroneously input by the operator.

When in step S504, i>M, that is, when determinations on all the hole positions P1 to PM as to whether or not the hole position in the same coordinates is present in the CAD shape information are completed, the coordinate value check unit 50 determines whether or not β=NULL, that is, whether or not the information of the hole position Pi stored in the predetermined storage region (β) is present (S506). When β=NULL, that is, when the information of the hole position Pi stored in the predetermined storage region (β) is not present, the coordinate value check unit 50 determines that the coordinate value matching is OK (correct) (S507), and completes the coordinate value check processing.

On the other hand, when in step S506, a formula of β=NULL does not hold true, that is, when the information of the hole position Pi stored in the predetermined storage region (β) is present, the coordinate value check unit 50 determines that an input error is made by the operator in the coordinate value of the hole position in the NC shape information which is in the middle of being produced by the operator (S508). Thereafter, the coordinate value check unit 50 feeds, to the display unit 80, information on the result of the determination including the information of the coordinate value of the hole position in which the input error occurs, and completes the coordinate value check processing.

The information of the coordinate value of the hole position of the input error which is fed to the display unit 80 is displayed, as shown in FIG. 16, on the display unit 80 with the coordinate value error display unit 84. For example, the coordinate value error display unit 84 is set in the program display unit 82 so as to highlight the coordinate value of the hole position. The coordinate value error display unit 84 may be set, as shown in FIG. 16, on the CAD data display unit 81 in addition to the program display unit 82.

(Coordinate Value Check; Contour Shape)

Figure 9B:
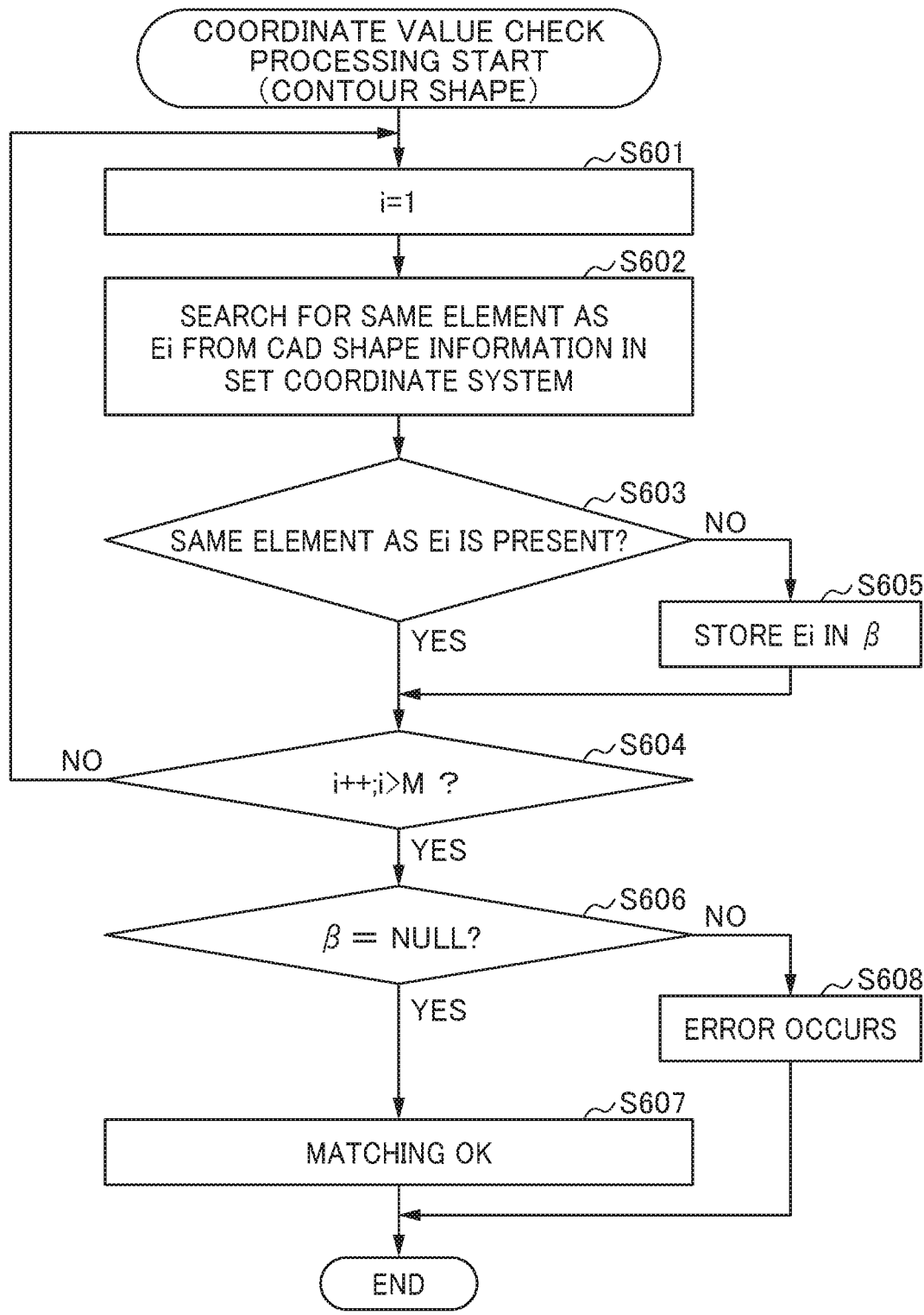
FIG. 9B is a flowchart showing coordinate value check processing (contour shape) which is performed with the coordinate value check unit.

FIG. 9A is a diagram showing examples of the NC shape information in contouring on which the coordinate matching is performed with the coordinate value check unit and the CAD shape information in the coordinate system which is set with the coordinate setting unit. FIG. 9B is a flowchart showing the coordinate value check processing (contour shape) which is performed with the coordinate value check unit.

As shown in FIG. 9A, in the NC shape information storage unit 13, as the contour shape produced by the operator, the elements E1, E2, E3, . . . and EM are stored. Examples of the element include a straight line, a circle, an arc and the like.

The coordinate value check unit 50 first sets the number of times of repetition processing i such that i=1 (S601). Then, the coordinate value check unit 50 reads, from the second CAD shape information storage unit 42, the CAD shape information in the coordinate system which is set, searches for, from the CAD shape information, an element in the same coordinates as the element Ei in the NC shape information (S602) so as to determine whether or not the element in the same coordinates as the element Ei in the NC shape information is present in the CAD shape information (S603). Information on the CAD shape information related to the element in the same coordinates as the element Ei in the NC shape information is the matching coordinate information.

When in step S603, the element in the same coordinates as the element Ei in the NC shape information is present in the CAD shape information, the coordinate value check unit 50 increments the number of times of repetition processing i and determines whether or not i>M (S604). When i≤M, the coordinate value check unit 50 returns to step S601 so as to repeat processing from step S601 to step S604. When in step S603, the element in the same coordinates as the element Ei in the NC shape information is not present in the CAD shape information, the coordinate value check unit 50 stores the information of the element Ei in the predetermined storage region (β) (S605), and transfers to step S604. The information of the element Ei stored in this way is the information of the element of the contour shape which is assumed to be erroneously input by the operator.

When in step S604, i>M, that is, when determinations on all the elements E1 to EM as to whether or not the element in the same coordinates is present in the CAD shape information are completed, the coordinate value check unit 50 determines whether or not β=NULL, that is, whether or not the information of the element Ei stored in the predetermined storage region (β) is present (S606). When β=NULL, that is, when the information of the element Ei stored in the predetermined storage region (β) is not present, the coordinate value check unit 50 determines that the coordinate value matching is OK (correct) (S607), and completes the coordinate value check processing.

On the other hand, when in step S606, a formula of β=NULL does not hold true, that is, when the information of the element Ei stored in the predetermined storage region (β) is present, the coordinate value check unit 50 determines that an input error is made by the operator in the coordinate value of the contour shape in the NC shape information which is in the middle of being produced by the operator (S608), and feeds, to the display unit 80, information on the result of the determination including the information of the coordinate value of the contour shape in which the input error occurs, and completes the coordinate value check processing.

The information of the coordinate value of the contour shape of the input error which is fed to the display unit 80 is displayed, as shown in FIG. 17, on the display unit 80 with the coordinate value error display unit 84. The coordinate value error display unit 84 is set in the program display unit 82 so as to highlight the coordinate value of the contour shape. The coordinate value error display unit 84 may be set, as shown in FIG. 17, on the CAD data display unit 81 in addition to the program display unit 82.

As described above, the machining program generation support device 1 includes the coordinate system setting unit 41, the second CAD shape information storage unit 42 and the coordinate value check unit 50, and thus it is possible to determine whether or not an input error is made by the operator in the coordinate value of the hole position or the contour shape in the NC shape information which is in the middle of being produced by the operator.

(Candidate Prediction; Hole Positions)

Figure 10:
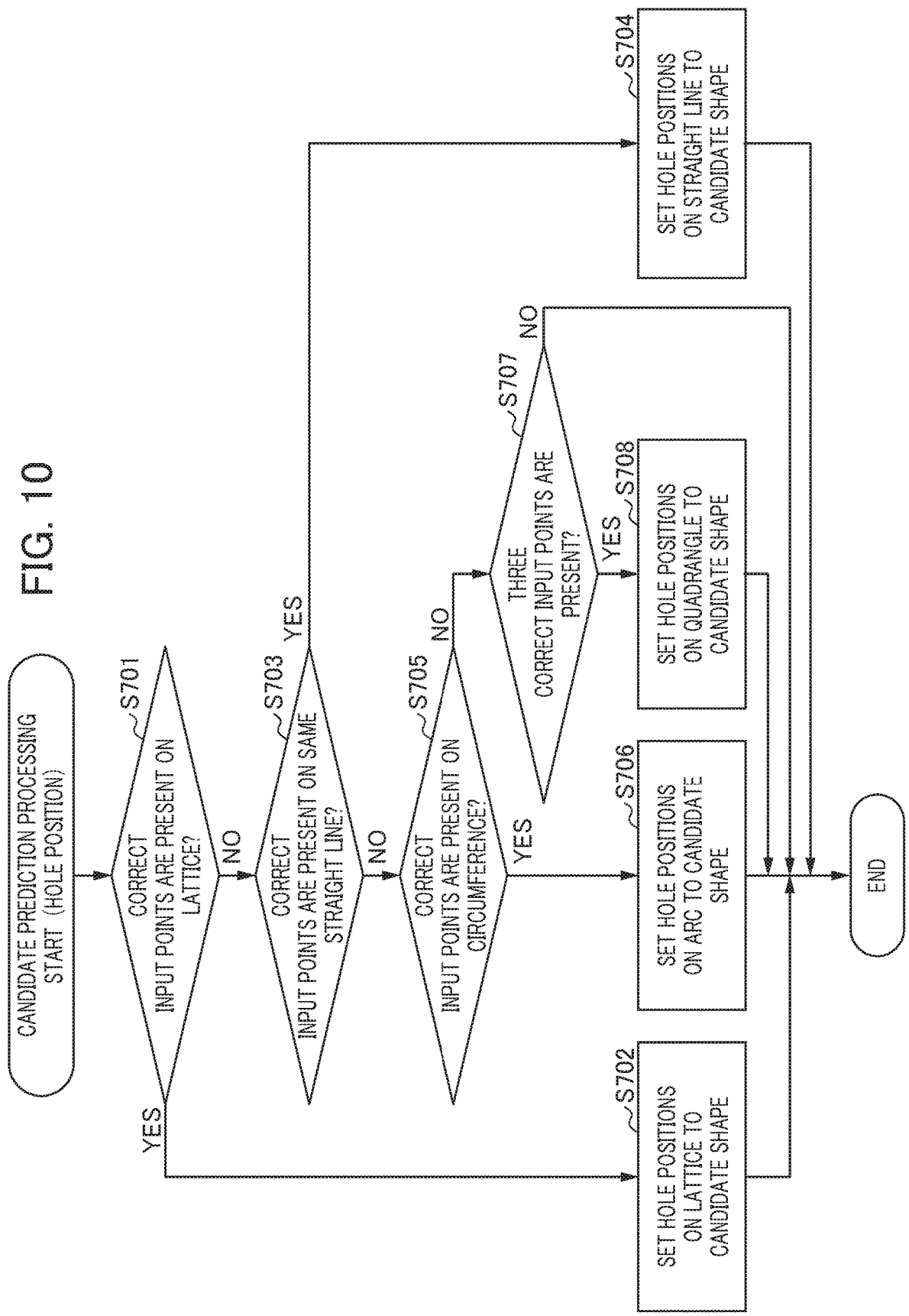
FIG. 10 is a flowchart showing candidate prediction processing (hole positions) which is performed with a candidate prediction unit.

FIG. 10 is a flowchart showing candidate prediction processing (hole positions) which is performed with the candidate prediction unit. FIGS. 11A to 11F are diagrams individually showing examples of matching shape information in drilling, a part of an input error which is made by the operator and a candidate shape which is generated with the candidate prediction unit.

Figure 11A:
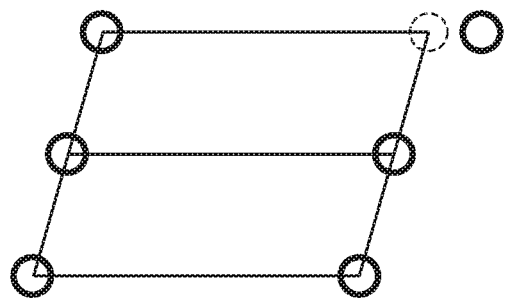
FIG. 11A is a diagram showing examples of matching shape information in drilling, a part of an input error which is made by the operator and a candidate shape (lattice) which is generated with the candidate prediction unit.
Figure 11B:
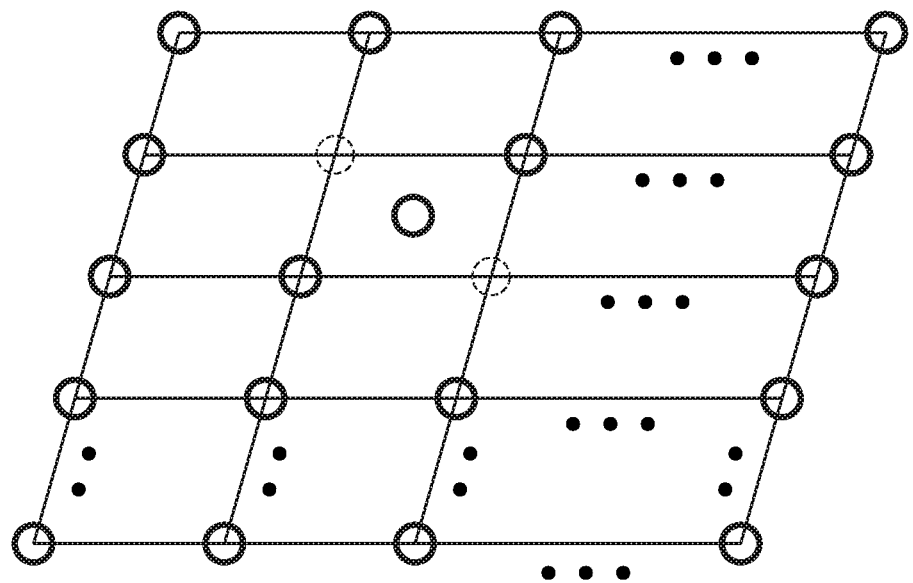
FIG. 11B is a diagram showing other examples of the matching shape information in drilling, the part of the input error which is made by the operator and the candidate shape (lattice) which is generated with the candidate prediction unit.
Figure 11C:
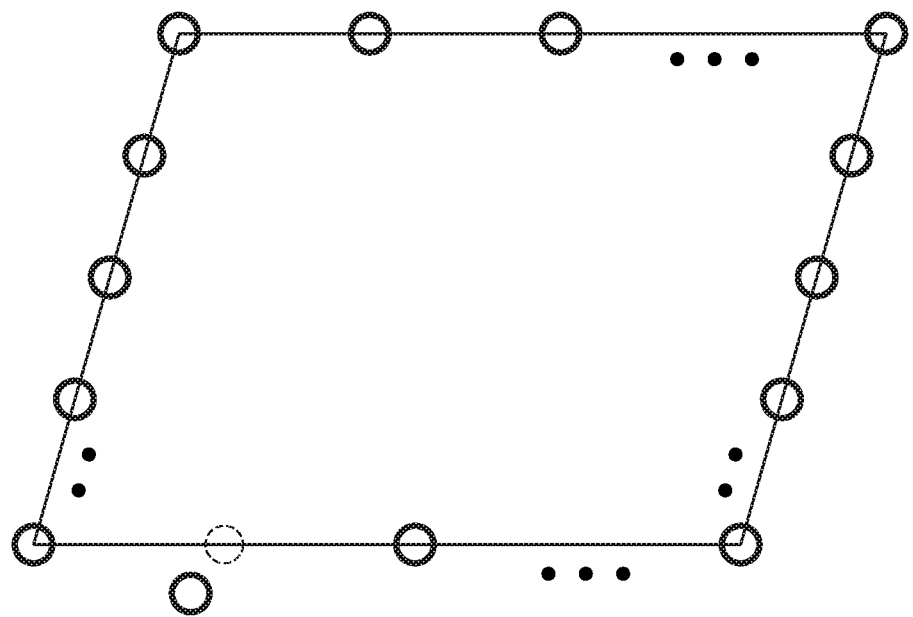
FIG. 11C is a diagram showing yet other examples of the matching shape information in drilling, the part of the input error which is made by the operator and the candidate shape (lattice) which is generated with the candidate prediction unit.

The candidate prediction unit 60 first acquires, from the coordinate value check unit 50, the CAD shape information in the coordinate system which is set so as to determine whether or not correct input points are present on a lattice for the hole positions of the CAD shape information that have been checked with the coordinate value check unit 50 (S701). Whether or not a lattice is provided can be determined by whether or not 6 or more hole positions are present in the CAD shape information. In the examples of the lattice shown in FIGS. 11A to 11C, solid-line circles arranged on the lattice indicate correct input points. The solid-line circle which is arranged to be displaced from the lattice is an input point which is assumed to be erroneously input by the operator. When the correct input points are present on the lattice, the candidate prediction unit 60 predicts hole positions on the lattice following the hole positions on the lattice in the CAD shape information serving as the matching coordinate information, sets the predicted hole positions to a candidate shape and completes the candidate prediction processing (S702). In FIGS. 11A to 11C, broken-line circles arranged on the lattice indicate the circles of the candidate shape which are predicted. The information of the candidate shape which is generated in this way is fed to the display unit 80.

Figure 11D:
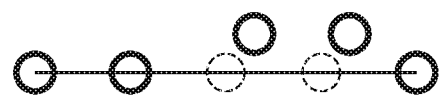
FIG. 11D is a diagram showing examples of the matching shape information in drilling, the part of the input error which is made by the operator and the candidate shape (straight line) which is generated with the candidate prediction unit.

When in step S701, the correct input points are not present on the lattice, the candidate prediction unit 60 determines whether or not the correct input points are present on the same straight line in the hole positions of the CAD shape information (S703). In an example of a straight line shown in FIG. 11D, solid-line circles arranged on the same straight line indicate correct input points. The solid-line circles which are arranged to be displaced from the same straight line are input points which are assumed to be erroneously input by the operator. When the correct input points are present on the same straight line, the candidate prediction unit 60 predicts hole positions on a straight line following the hole positions on the straight line of the CAD shape information, sets the predicted hole positions to a candidate shape and completes the candidate prediction processing (S704). In FIG. 11D, broken-line circles arranged on the same straight line indicate the circles of the candidate shape which are predicted. The information of the candidate shape which is generated in this way is fed to the display unit 80.

Figure 11E:
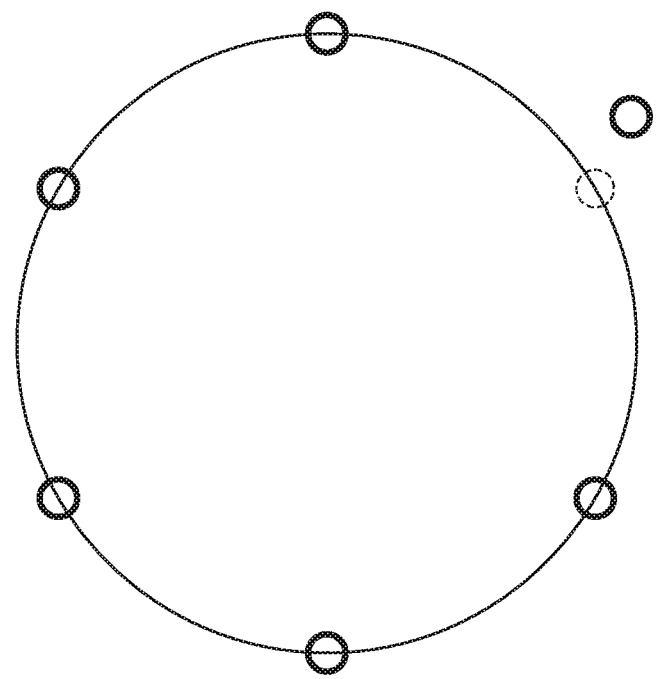
FIG. 11E a diagram showing examples of the matching shape information in drilling, the part of the input error which is made by the operator and the candidate shape (arc) which is generated with the candidate prediction unit.

When in step S703, the correct input points are not present on the same straight line, the candidate prediction unit 60 determines whether or not the correct input points are present on a circumference in the hole positions of the CAD shape information (S705). In an example of an arc shown in FIG. 11E, solid-line circles arranged on a circumference indicate correct input points. The solid-line circle which is arranged to be displaced from the circumference is an input point which is assumed to be erroneously input by the operator. When the correct input points are present on the circumference, the candidate prediction unit 60 predicts hole positions on an arc following the hole positions on the arc of the CAD shape information, sets the predicted hole positions to a candidate shape and completes the candidate prediction processing (S706). In FIG. 11E, a broken-line circle arranged on the circumference indicates the circle of the candidate shape which is predicted. The information of the candidate shape which is generated in this way is fed to the display unit 80.

Figure 11F:
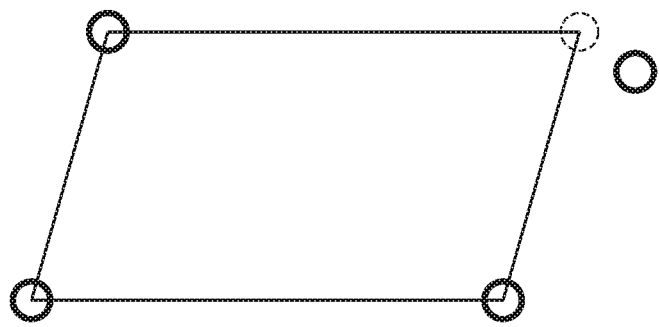
FIG. 11F is a diagram showing examples of the matching shape information in drilling, the part of the input error which is made by the operator and the candidate shape (quadrangle) which is generated with the candidate prediction unit.

When in step S705, the correct input points are not present on the circumference, the candidate prediction unit 60 determines whether or not three correct input points are present in the hole positions of the CAD shape information (S707). When three input points are present, the input points can be determined to be arranged at the vertices of a quadrangle. In an example of a quadrangle show in FIG. 11F, solid-line circles which are arranged at the vertices of the quadrangle indicate correct input points. The solid-line circle which is arranged to be displaced from the vertex of the quadrangle is an input point which is assumed to be erroneously input by the operator. When three correct input points are present, the candidate prediction unit 60 predicts hole positions on vertices of a quadrangle following the three hole positions in the CAD shape information, sets the predicted hole positions to a candidate shape and completes the candidate prediction processing (S708). In FIG. 11F, a broken-line circle arranged on the vertex of the quadrangle indicates the circle of the candidate shape which is predicted. The information of the candidate shape which is generated in this way is fed to the display unit 80.

When in step S707, three correct input points are not present, the candidate prediction unit 60 does not perform the candidate prediction in the hole positions and completes the candidate prediction processing.

For example, the position and the coordinate value of the candidate shape of the hole positions which are predicted and generated in this way with the candidate prediction unit 60 are displayed, as shown in FIG. 16, with the candidate display unit 85 so as to overlap the CAD data of the CAD data display unit 81 in the display unit 80.

(Candidate Prediction; Contour Shape)

FIG. 12 is a flowchart showing the candidate prediction processing (contour shape) which is performed with the candidate prediction unit. FIG. 13 is a diagram showing examples of the matching shape information in contouring, a shape which is caused by an input error of the operator and the candidate shape which is generated with the candidate prediction unit.

The candidate prediction unit 60 first acquires, from the coordinate value check unit 50, the CAD shape information in the coordinate system which is set, searches for an element K connected to a correctly input element in the contour shape of the CAD shape information that has been checked with the coordinate value check unit 50 (S801) and stores the element K in the predetermined storage region (S802).

Specifically, when as shown in FIG. 13, between a correctly input element Ei−1 and an element Ei+1, an element Ei which is not connected to the elements Ei−1 and Ei+1 is present (the element Ei is an erroneous input shape which is assumed to be erroneously input by the operator), as indicated by a broken line in FIG. 13, the candidate prediction unit 60 searches for and stores the element connected to the elements Ei−1 and Ei+1. Thereafter, the candidate prediction unit 60 completes the candidate prediction processing.

For example, the position and the coordinate value of the candidate shape of the contour shape which are predicted and generated in this way with the candidate prediction unit 60 are displayed, as shown in FIG. 17, with the candidate display unit 85 so as to overlap the CAD data of the CAD data display unit 81 in the display unit 80.

(Program Correction; Hole Positions)

Figure 14:
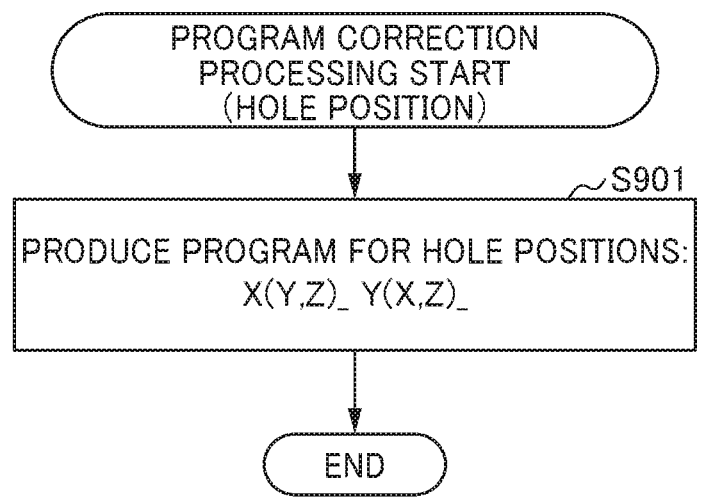
FIG. 14 is a flowchart showing machining program correction processing (hole positions) which is performed with a machining program correction unit.

FIG. 14 is a flowchart showing machining program correction processing (hole positions) which is performed with a machining program correction unit.

The operator checks the display of the display unit 80, selects and inputs, with the candidate selection unit 71, the candidate shape of the predicted hole positions, for example, on the screen and thereby can correct an input error of the hole position. When the candidate shape of the hole position predicted with the candidate selection unit 71 is selected and input, the program correction unit 72 produces a program for the hole position which is selected and input (S901) and reflects the program on the NC program which is in the middle of being produced by the operator so as to automatically correct the NC program.

(Program Correction; Contour Shape)

Figure 15:
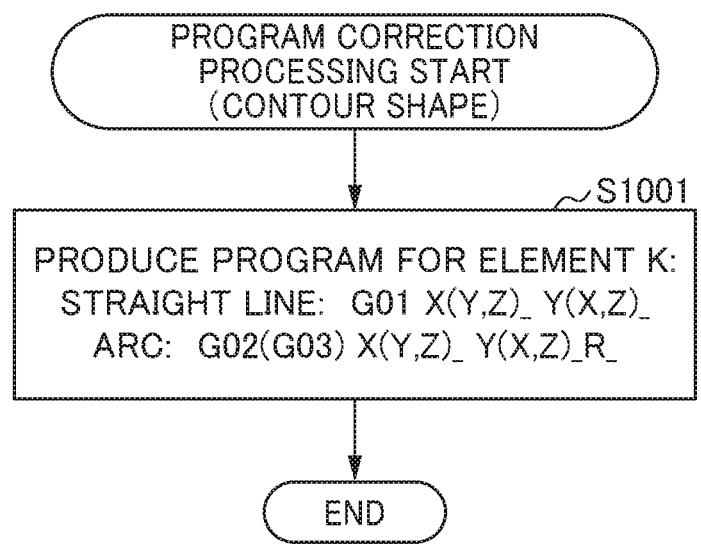
FIG. 15 is a flowchart showing the machining program correction processing (contour shape) which is performed with the machining program correction unit.

FIG. 15 is a flowchart showing the machining program correction processing (contour shape) which is performed with the machining program correction unit.

The operator checks the display of the display unit 80, selects and inputs, with the candidate selection unit 71, the candidate shape of the predicted contour shape, for example, on the screen and thereby can correct an input error of the contour shape. When the candidate shape of the contour shape predicted with the candidate selection unit 71 is selected and input, the program correction unit 72 produces a program for the element K of the contour shape which is selected and input (S1001) and reflects the program on the NC program which is in the middle of being produced by the operator so as to automatically correct the NC program.

As described above, in the machining program generation support device 1 of the present embodiment, the NC program which is in the middle or being produced by the operator is compared with the CAD data, an input error made by the operator in the NC program which is in the middle of being produced is automatically checked and the result thereof is visually displayed for the operator. In this way, the operator can easily check the presence of an input error in the program which is in the middle of being produced.

Although the embodiment of the machining program generation support device of the present disclosure has been described, the machining program generation support device of the present disclosure is not limited to the embodiment described above, and various modifications and variations are possible. For example, in the embodiment described above, the machining program generation support device which supports the generation of the NC program for the numerical controller that controls the machine tool is illustrated. However, the machining program generation support device of the present disclosure is not limited to this configuration and can be applied to various machining program generation support devices which support the generation of machining programs for various industrial machines.

EXPLANATION OF REFERENCE NUMERALS

1: machining program generation support device
12: NC program analysis unit (machining program analysis unit)
22: CAD data analysis unit
30: relative position matching unit
41: coordinate system setting unit
50: coordinate value check unit
60: candidate prediction unit
71: candidate selection unit
72: program correction unit
80: display unit

What is claimed is:

1. A machining program generation support device which supports generation of a machining program for a workpiece from CAD data of the workpiece, the machining program generation support device comprising:
    a processor configured to:
        analyze the CAD data so as to obtain CAD shape information serving as shape information of the workpiece;
        analyze the machining program that is in a middle of being produced by an operator so as to obtain machining shape information that is in a middle of being produced serving as the shape information of the workpiece;
        perform relative position matching of shapes of the CAD shape information and the machining shape information that is in the middle of being produced so as to obtain relative position matching shape information and to determine, based on the relative position matching shape information, whether or not an input error of a position is made by the operator in the machining shape information;
        set a coordinate system of the CAD shape information; and
        perform matching of coordinates of the CAD shape information and coordinates of the machining shape information so as to obtain matching coordinate information where the coordinates are matched and to determine, based on the matching coordinate information, whether or not an input error of a coordinate value is made by the operator in the machining shape information;
        receive selection and input of candidate shape information from the operator; and
        automatically correct the machining program based on the candidate shape information; and
    a display configured to:
        display the machining shape information and to display, as an error, a part of the input error of the position made by the operator in the machining shape information; and
        display, as an error, a part of the input error of the coordinate value made by the operator in the machining shape information,
    wherein when the machining program is corrected, the display is further configured to display the corrected machining program, and the processor is further configured to cause the workpiece to be machined according to the corrected machining program.

2. The machining program generation support device according to claim 1,
    wherein the processor is further configured to predict, based on the CAD shape information in the coordinate system, a candidate shape following the matching coordinate information so as to predict a candidate shape following the machining shape information, and to automatically generate the candidate shape information, and
    wherein the display is further configured to display the candidate shape information such that the candidate shape information overlaps the machining shape information.

3. The machining program generation support device according to claim 1, wherein the display is further configured to highlight the display of the error.

4. A machining program generation support device which supports generation of a machining program for a workpiece from CAD data of the workpiece, the machining program generation support device comprising:
- a processor configured to:
  - analyze the CAD data so as to obtain CAD shape information serving as shape information of the workpiece;
  - analyze the machining program that is in a middle of being produced by an operator so as to obtain machining shape information that is in a middle of being produced serving as the shape information of the workpiece;
  - perform relative position matching of shapes of the CAD shape information and the machining shape information that is in the middle of being produced so as to obtain relative position matching shape information and to determine, based on the relative position matching shape information, whether or not an input error of a position is made by the operator in the machining shape information;
  - set a coordinate system of the CAD shape information; and
  - perform matching of coordinates of the CAD shape information and coordinates of the machining shape information so as to obtain matching coordinate information where the coordinates are matched and to determine, based on the matching coordinate information, whether or not an input error of a coordinate value is made by the operator in the machining shape information;
  - predict, based on the CAD shape information in the coordinate system, a candidate shape following the matching coordinate information so as to predict a candidate shape following the machining shape information, and to automatically generate candidate shape information; and
- a display configured to:
  - display the machining shape information and to display, as an error, a part of the input error of the position made by the operator in the machining shape information;
  - display, as an error, a part of the input error of the coordinate value made by the operator in the machining shape information; and
  - display the candidate shape information such that the candidate shape information overlaps the machining shape information,
- wherein the processor is further configured to cause the workpiece to be machined according to the candidate shape information.

* * * * *